(12) United States Patent
Swan

(10) Patent No.: US 7,933,587 B1
(45) Date of Patent: Apr. 26, 2011

(54) RETRIEVING AND STORING UPDATED CONTACT RECORDS

(76) Inventor: Joseph G. Swan, Hermosa Beach, CA (US)

( * ) Notice: Subject to any disclaimer, the term of this patent is extended or adjusted under 35 U.S.C. 154(b) by 178 days.

(21) Appl. No.: 12/242,737

(22) Filed: Sep. 30, 2008

Related U.S. Application Data

(63) Continuation of application No. 10/782,522, filed on Feb. 19, 2004, now Pat. No. 7,440,746.

(60) Provisional application No. 60/449,062, filed on Feb. 21, 2003.

(51) Int. Cl.
 *H04L 1/725* (2006.01)

(52) U.S. Cl. ............... 455/412.1; 455/412.2; 455/456.2; 709/218; 709/206

(58) Field of Classification Search ............... 455/412.1, 455/414.1, 414.2, 415, 556.2; 705/14, 26, 705/27, 8, 9; 707/1, 9, 10, 14, 104, 200, 707/8, 758; 709/217, 222, 229, 206, 226, 709/218, 245; 45/412.1, 414.1, 414.2, 415, 45/556.2, 418, 456.2; 715/81, 803, 804, 715/856; 719/329
See application file for complete search history.

(56) References Cited

U.S. PATENT DOCUMENTS

| | | | |
|---|---|---|---|
| 4,937,851 | A | 6/1990 | Lynch et al. |
| 6,633,311 | B1 | 10/2003 | Douvikas et al. |
| 6,760,728 | B1 | 7/2004 | Osborn |
| 6,848,048 | B1 | 1/2005 | Holmes |
| 6,865,384 | B2 | 3/2005 | Sagi et al. |
| 6,873,841 | B1 | 3/2005 | Sagar |
| 7,440,746 | B1 | 10/2008 | Swan |
| 2002/0016857 | A1 | 2/2002 | Harari |
| 2002/0019844 | A1 | 2/2002 | Kurowski et al. |
| 2002/0023230 | A1 | 2/2002 | Bolnick et al. |
| 2002/0032589 | A1 | 3/2002 | Shah |
| 2002/0049751 | A1 | 4/2002 | Chen et al. |
| 2002/0065801 | A1 | 5/2002 | Goodwin, III et al. |
| 2002/0156895 | A1* | 10/2002 | Brown .......................... 709/226 |
| 2002/0174188 | A1 | 11/2002 | Clark et al. |
| 2003/0022657 | A1 | 1/2003 | Herschberg et al. |
| 2003/0061307 | A1 | 3/2003 | Daswani et al. |
| 2003/0083908 | A1 | 5/2003 | Steinmann |
| 2003/0131023 | A1 | 7/2003 | Bassett et al. |
| 2004/0024834 | A1 | 2/2004 | Alegria et al. |
| 2004/0051730 | A1 | 3/2004 | Douvikas et al. |
| 2004/0077363 | A1 | 4/2004 | Lazaro et al. |
| 2004/0078464 | A1 | 4/2004 | Rajan et al. |
| 2004/0092254 | A1 | 5/2004 | Henrick |
| 2004/0093317 | A1 | 5/2004 | Swan |
| 2004/0203659 | A1 | 10/2004 | Mikan |
| 2005/0055306 | A1* | 3/2005 | Miller et al. ..................... 705/37 |
| 2005/0149406 | A1 | 7/2005 | Bascobert et al. |
| 2005/0251448 | A1* | 11/2005 | Gropper .......................... 705/14 |
| 2006/0177030 | A1* | 8/2006 | Rajagopalan et al. ... 379/142.07 |
| 2007/0219918 | A1 | 9/2007 | Schull |
| 2008/0126362 | A1* | 5/2008 | Shoemaker et al. ............ 707/10 |
| 2009/0063512 | A1* | 3/2009 | Cheah ............................ 707/10 |
| 2009/0325540 | A1* | 12/2009 | Yach et al. .................... 455/405 |

* cited by examiner

*Primary Examiner* — Tan Trinh
(74) *Attorney, Agent, or Firm* — Joseph G. Swan, P.C.

(57) ABSTRACT

Provided are wireless and standalone handheld devices, such as PDAs and wireless telephones, that are configured for inputting a unique contact identifier that uniquely identifies a desired contact record, querying a central database of contact information to obtain the desired contact record, receiving the record and storing it. In various embodiments, such requests can be made directly over a wireless network or indirectly when synchronizing the handheld device with a computer connected to the Internet or to another network.

20 Claims, 15 Drawing Sheets

237

¤DIRECT LINE:   DIRECT FAX:   EMAIL:
(310) 555-1234   (310) 555-1235   JD@ACME.COM

JOHN DOE
PRESIDENT
ACME CORPORATION
123 MAIN STREET
LOS ANGELES, CA 90064

DIRECT LINE:   DIRECT FAX:   ¤EMAIL:
(310) 555-1237   (310) 555-1238   JJ@ACME.COM

JACK JONES
SALES MANAGER
ACME CORPORATION
123 MAIN STREET
LOS ANGELES, CA 90064

RETRIEVING AND STORING UPDATED CONTACT RECORDS

This application is a continuation of U.S. patent application Ser. No. 10/782,522, filed Feb. 19, 2004, now U.S. Pat. No. 7,440,746, which in turn claimed the benefit of U.S. Provisional Patent Application 60/449,062, titled "Automated Contact Information Sharing", which was filed on Feb. 21, 2003 (the '062 application). The forgoing applications are incorporated by reference herein as though set forth herein in full.

BACKGROUND OF THE INVENTION

1. Field of the Invention

The present invention pertains to devices for requesting, retrieving and storing into an embedded electronic address book contact information, such as information that might be included on a business card. It is particularly applicable to handheld devices such as wireless telephones and wireless or standalone PDAs.

2. Description of the Related Art

For a long time, the most common way to share one's contact information with another person was to communicate the information orally or to give that other person a printed business card. In either case, the recipient typically had to manually write the information into an address book. This often would require significant effort and it was difficult to later make changes to the information (e.g., if the other person moved or changed telephone numbers). An alternative, if a business card had been received, would be for the recipient to merely place the card into the appropriate position in a mechanical rolodex for later retrieval. This solution required some effort, although perhaps not as much as copying all the necessary information into an address book. However, a particular drawback of using a rolodex is that typically it is relatively large device and thus is not very portable.

Both of the foregoing techniques had certain common limitations. For instance, each required a single type of sorting (usually alphabetical according to the contact's last name). In addition, neither option facilitated subsequent sharing or duplicating of the contact information, thus hindering efficient personal networking.

Technology has, to some extent, improved the way contact information is stored and accessed. The emergence of personal information managers (PIMs), such as Microsoft Outlook™, that include an electronic address book allow contact information records to be stored electronically and then searched and/or sorted in a number of different ways. In addition, because the storage is electronic it usually can be backed up relatively easily, and contact information for a single individual sometimes can be shared electronically, such as by emailing the information to another person.

It is noted that certain on-line telephone directories also are presently in use. Such directories permit a user to search for a listing, and then the listing is displayed to the user via a Web page. However, the provided contact information generally is not sufficiently formatted to permit automatic entry into the user's electronic address book. Thus, the end user generally is required to manually copy such information into his or her electronic address book if local storage is desired. Further limitations of such on-line directories include: (i) the information regarding the contact provided to the end user usually is quite limited in scope (e.g., typically only name, address and telephone number are provided); and (ii) modification of the contact information according to such systems typically is very cumbersome. Thus, such on-line directories usually are not well-suited to entering contact information into an electronic address book or to efficient sharing of contact information in general.

SUMMARY OF THE INVENTION

As indicated above, electronic personal information management systems are very useful once the desired contact information has been input. However, the present inventor has recognized that the step of inputting contact information into an electronic address book in the first instance still must be done manually in most cases. This is the case principally for the following reasons.

Probably the most significant reason is the variety of incompatible PIMs used by different people. For example, Microsoft Outlook™ permits emailing of a contact record as a vCard directly from its electronic address book, and then, assuming the recipient also has Microsoft Outlook™, the recipient can simply double-click the attachment to open it, or can drag it to his or her Contacts to save it as an entry in his or her address book. However, as indicated above, this often only works if both parties have the exact same electronic address book, which often is not the case.

In addition, when such a sharing technique does work, it generally is limited to email communications. However, when people first meet each other they typically want a convenient way to share their contact information at that moment. Thus, exchanges of printed business cards are common. If the recipient later wishes to input the contact information into his or her electronic address book, it still must be done manually.

In this regard, while business card scanners are available, they are costly and usually not very accurate. This is particularly the case where the printed business card includes any significant graphics or non-standard formatting. Both of these frequently are desirable to distinguish one's business card.

These limitations have been found to be a significant impediment to the most efficient use of electronic address books. A solution to these problems was proposed in U.S. patent application Ser. No. 10/289,896 (the '896 application) of the same inventor titled, "Automated Contact Information Sharing," which application is incorporated by reference herein as though set forth herein in full. The '896 application provides an overall system for contact information sharing. The present invention relates to improved end-user devices for requesting, obtaining and storing contact information records, which may be used in conjunction with the systems of the '896 application.

Thus, in one aspect the invention is directed to a wireless handheld device for requesting, receiving and storing contact information. According to this aspect of the invention, the device includes a transceiver for wireless (e.g., cellular) communications, a data storage device (e.g., RAM or a small hard drive), a user interface (e.g., including any or all of: a telephone keypad, any other numeric keypad, a full alphanumeric keyboard, a liquid crystal display (LCD) screen, a touch-sensitive display screen, any other type of display screen, a microphone, a speaker, a headset and/or any other user interface device typically provided by a PDA or a wireless telephone), and a processor (e.g., one or more CPUs or other processing devices). The processor is operatively coupled to the transceiver, the user interface and the data storage device, and is used for running an embedded electronic address book and for executing other computer-executable process steps. Preferably, the wireless handheld device is programmed to: i) input via the user interface a unique contact identifier that uniquely identifies a desired contact record, ii) generate a request message that includes the unique contact identifier and is addressed to a central hub that maintains and distributes contact information, iii) transmit the request message using the transceiver, iv) receive the requested contact record, and v) store the received contact record for access by the embedded electronic address book. In addition, the received contact record preferably includes plural different contact information fields (e.g., one or more name, post office address, email address, and telephone number fields), and is in a format that permits unambiguous identification of said plural different contact information fields upon application of pre-specified mechanical rules. More preferably, that format matches the format of the embedded electronic address book.

Such an arrangement often can greatly facilitate the storage of contact information into an end user's handheld electronic device, significantly limiting the number and type of keystrokes that are required to input contact information. In certain embodiments, only numeric characters are required, which greatly reduces the effort required to store contact information for many types of wireless telephones.

In addition, such a device can be provided with programming to let the end user view the contact information before deciding whether or not to store it. Also, the contact identifier may include a unique identifier (e.g., a telephone number for the desired contact) and a verification code (e.g., a few digits from another number in the desired contact record). Such an approach can avoid download errors and help to prevent abuse of the system by telemarketers and others seeking to mine the central database for contact information.

Still further, the wireless handheld device may be programmed to record an audio message and store either the audio message itself or certain indicia of the audio message (e.g., for speech recognition purposes) in association with the contact record. In such an event, additional programming preferably is provided to pull up the contact record in the event the end user speaks the audio message.

In a further aspect, the invention is directed to a system for requesting, receiving and storing contact information, the system including a handheld device (e.g., wireless or standalone) and a main computer. The handheld device has a user interface (e.g., including any or all of: a telephone keypad, any other numeric keypad, a full alphanumeric keyboard, a liquid crystal display (LCD) screen, a touch-sensitive display screen, any other type of display screen, a microphone, a speaker, a headset and/or any other user interface device typically provided by a PDA or a wireless telephone), a data storage device (e.g., RAM or a small hard drive), a first communication port, and a first processor (e.g., one or more CPUs or other processing devices). The first processor is operatively coupled to the user interface, the data storage device and the first communication port, and is used for running an embedded electronic address book and for executing other computer-executable process steps. The main computer has a second communication port, a network interface to interface with a communications network (e.g., to communicate via the Internet, a wireless service provider the public telephone lines and/or any other public or non-public communication system), and a second processor (e.g., one or more CPUs or other processing devices). The second processor is operatively coupled to the second communication port and the network interface, and is used for executing computer-executable process steps. Preferably, the handheld device is programmed to input a unique contact identifier via the user interface and to store the unique contact identifier into the data storage device. Also, the handheld device and the main computer preferably are programmed so that, after connecting the first communication port to the second communication port, automatically upon a user activation: (1) the unique contact identifier is transferred from the data storage device of the handheld device to the main computer, (2) the main computer generates a message requesting a contact record corresponding to the unique contact identifier and addressed to a central hub that maintains and distributes contact information, and transmits the message over the communications network via the network interface, (3) the main computer receives the requested contact record, (4) the main computer transfers the received contact record to the handheld unit, and (5) the handheld unit stores the contact record for use by its embedded electronic address book. The received contact record preferably includes plural different contact information fields (e.g., one or more name, post office address, email address, and telephone number fields) and is in a format that permits unambiguous identification of said plural different contact information fields upon application of pre-specified mechanical rules. More preferably, that format matches the format of the electronic address book embedded in the handheld device or an electronic address book embedded in the main computer.

As a result of this arrangement, contact identifiers can be stored in a standalone PDA or other handheld device (or even in a wireless device that does not have the requisite connectivity) and then, upon synchronization with an Internet-connected (or otherwise appropriately networked or connected) computer, the required contact information can be downloaded to such device. As in the embodiment described above, preferably, the end user is given the option to view the contact record before deciding whether or not to store it. In this case, however, the contact record may be viewed on either or both of the handheld device or the main computer (e.g., at the end user's option). Other more particularized aspects include those set forth above for the previous embodiment.

In other aspects, the present invention addresses the prior art problems by providing systems, methods and techniques in which contact records are maintained by a central database, but with the content of each being controlled by the respective contact. Such an arrangement permits flexible distribution and/or storage of contact records.

Thus, in another aspect the invention is directed to a system for controlling, distributing and receiving contact information. The system includes: a central hub (such as a cluster of Internet servers) for maintaining and distributing contact information, multiple terminals (e.g., personal computers or wireless personal digital assistants) electronically coupled to the central hub for transmitting requests for contact information to the central hub, and multiple contacts in communication with the central hub. According to this aspect of the invention, each contact has an associated contact record maintained by the central hub, each such contact record includes multiple different contact information fields, and each contact controls the content in the contact information fields for its associated contact record. Upon receipt of a request for a requested contact record from one of the terminals, the central hub means automatically transmits the requested contact record to the requesting terminal in a format that permits unambiguous identification of the different contact information fields upon application of pre-specified mechanical rules. The request may include an identification code that uniquely identifies the desired contact or may include search terms that may be used to find one or more matching contacts. In response, the contact information transmitted to the end user may be provided as an e-mail attachment, a FTP file transfer or any similar technique. More preferably, however, such contact information is directly communicated to the end user's specially configured electronic address book or to a special-purpose interface program that is used by the end user to communicate with the central hub and that functions as an interface between the central hub and the end user's PIM (which includes an electronic address book).

In a further aspect, the invention is directed to controlling, distributing and receiving contact information. According to this aspect of the invention, multiple contacts communicate with a central hub. Each such contact has an associated contact record maintained by the central hub, and each contact record includes multiple different contact information fields. Each contact controls the content for its associated contact record. Multiple end users, each electronically coupled to the central hub using an electronic terminal, transmit requests for contact information to the central hub. Upon receipt of a request for a requested contact record from one of the end users, the central hub automatically transmits the requested contact record to the requesting end user in a format that permits unambiguous identification of the multiple different contact information fields upon application of pre-specified mechanical rules.

By providing a central hub which maintains contact records for a number of different contacts, the present invention often can facilitate sharing of contact information. In addition, because the central hub transmits a requested contact record in a standard format, interpretation of the contact record often is greatly facilitated. As a result, an end user typically can display and/or store such information via an electronic address book or other software program. This is significantly different than conventional contact information retrieval systems, which typically download contact information in a format that is human-readable, but is not well-suited to machine interpretation. Still further, because each contact controls the content for its associated contact record in the present invention, updating of the contact records typically is significantly easier than is possible with conventional techniques.

In more particularized aspects of the foregoing embodiments, the format in which the requested contact record is transmitted is selected by the central hub based on a preference of the requesting end user (e.g., transmitted by the end user's terminal) and/or based on a type of program used by the requesting end user to interface with the central hub. As a result of such customization, in connection with the other features of the invention, a variety of different contacts can provide their contact information to a variety of different end users, and in each case the contact information can be made compatible with the electronic address book or similar program used by the end user.

In the preferred embodiment of the invention, the central hub includes means for communicating electronically with the contacts and means for automatically (i.e., without human intervention) incorporating content changes submitted by each contact into the contact record associated with such contact. As a result, the entire process of sharing contact information between contacts and end users can be fully, nearly fully or substantially automated.

In other particularized aspects of the invention, the central hub includes means for recording the identities of end users that have stored a particular contact record and means for notifying such end users when the particular contact record is modified. As a result of this feature of the invention, updates to contact records made by individual contacts can be automatically provided to the end users who have stored such contact records. This feature of the invention is believed to solve a significant and costly problem that exists with conventional systems. Specifically, when a contact moves, changes telephone numbers, has his or her area code change, or experiences any other change in his or her contact information, the costs and difficulty of notifying all interested persons regarding the change (or even identifying all such persons) can be enormous when utilizing only conventional systems and techniques. However, such notification can be nearly costless when utilizing a system according to the present invention.

Also, in the foregoing systems and techniques any or all of the following features may be provided: b) the request is generated by a user submitting a unique identification code for the desired contact record via a user interface; c) the unique identification code for the desired contact record is highlighted on a business card; d) the request is generated by a user submitting a textual contact identifier for the desired contact record via a user interface; e) the request is generated by scanning a computer-readable code; f) the request is generated by a user submitting textual search criteria for the desired contact record via a user interface; g) the request automatically is generated by said one of the plural terminal means upon opening an email attachment containing a contact identifier corresponding to the desired contact record; h) the request automatically is generated by said one of the plural terminal means in response to opening a link to said central hub that contains a contact identifier corresponding to the desired contact record; i) the request includes a geographic location of said one of the plural terminal means; and/or j) said one of the plural terminal means has an electronic address book, and wherein the requested contact record corresponds to a contact for which the electronic address book does not currently have a contact record.

The foregoing summary is intended merely to provide a brief description of the general nature of the invention. A more complete understanding of the invention can be obtained by referring to the claims and the following detailed description of the preferred embodiments in connection with the accompanying figures.

BRIEF DESCRIPTION OF THE DRAWINGS

FIG. 9B illustrates a representative printed business card having the contact's direct telephone number designated as the unique assigned identification code for the contact.

FIG. 9C illustrates a representative printed business card having the contact's e-mail address designated as the unique assigned identification code for the contact.

FIG. 10 illustrates an end-user interface for submitting search criteria for a desired contact according to a representative embodiment of the present invention.

DESCRIPTION OF THE PREFERRED EMBODIMENT(S)

| Table of Contents: | | |
| --- | --- | --- |
| I. | System Description | 11 |
| II. | Contact Communications with the Central Hub. | 15 |
| III. | End User Communications with the Central Hub. | 22 |
| IV. | Processing by the Hub. | 38 |
| V. | Exemplary Embodiments. | 45 |
| VI. | Hardware Environment. | 57 |
| VII. | Additional Considerations. | 59 |

I. System Description

Figure 1:
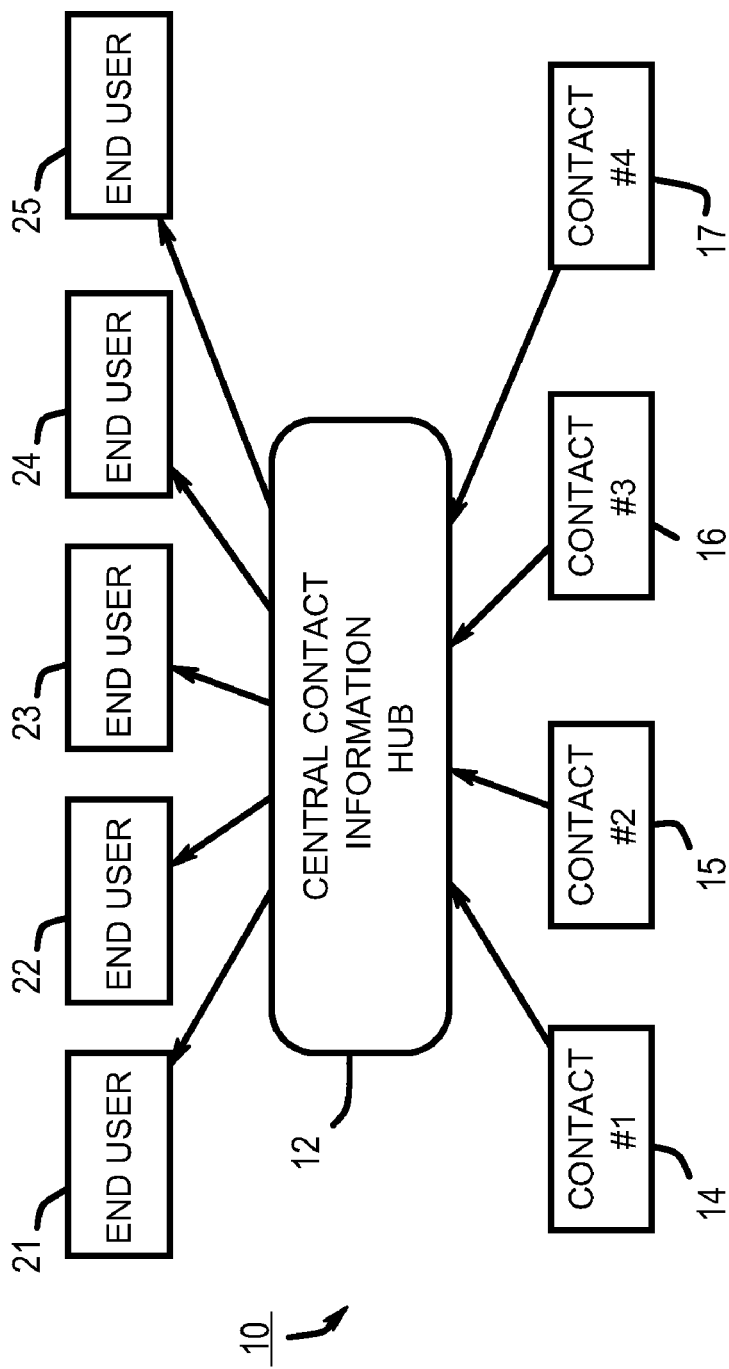
FIG. 1 is a block diagram illustrating the general concept of a system according to the present invention.

FIG. 1 illustrates a block diagram showing the general concept of a system according to the present invention. As shown in FIG. 1, a central hub 12 is in communication with various contacts (e.g., contacts 14-17) and various end users (e.g., end users 21-25). Although only four contacts are illustrated in FIG. 1, it should be understood that this is for ease of illustration only. Generally, there will be many more contacts in communication with hub 12, such as more than a thousand, ten thousand, hundred thousand or million contacts 14-17. Similarly, although there are only five end users shown in FIG. 1, this also is for illustration purposes only. Generally, there will be more than a thousand, ten thousand, hundred thousand, million or ten million end users 21-25. As will become apparent below, all of such contacts 14-17 and end users 21-25 typically will not be in contact with hub 12 simultaneously, but rather will only contact hub 12 on an as-needed basis.

In order to simplify the present discussion, when reference is made herein to a single contact that contact generally will be referred to as contact 14. Similarly, when reference is made herein to a single end user that end user generally will be referred to as end user 21. However, it should be understood that contact 14 is merely representative of any of the contacts 14-17 and that end user 21 is merely representative of any of the end users 21-25.

Ordinarily, both end users 21-25 and contacts 14-17 will communicate with hub 12 using various devices that are capable of electronic communication and that have a display for displaying text. Such devices may include various desktop computers, laptop computers, personal digital assistants (PDAs) and/or wireless telephones. In the preferred embodiment of the invention all of such devices communicate with hub 12 using the Internet or any other publicly accessible network. However, it is also possible for any or all of such devices to communicate using other networks, communication channels and/or technologies in addition to, or instead of, the Internet. For instance, any of end users 21-25 or contacts 14-17 might utilize a wireless telephone or a wireless PDA that communicates through a base station. Such a wireless device, in turn, typically would communicate via a private or public wireless system which would then communicate with hub 12, e.g., via the Internet, via a wide area network (WAN), via public switched telephone network (PSTN) lines, via a satellite link and/or via any combination of these. Alternatively, any of end users 21-25 or contacts 14-17 might communicate with hub 12, e.g., directly via the Internet, via a WAN, via PSTN telephone lines, via a satellite link and/or via any combination of these.

As will become apparent below, the mode of communication is not critical, although it is preferable that at least end users 21-25 have easy access to hub 12. This typically will mean that hub 12 is accessible via the Internet and/or via another public network or a public wireless system.

In the preferred embodiment of the invention, central hub 12 includes a cluster of servers and is largely or wholly automated, i.e., providing automated responses (without the necessity of human interaction) to communications from contacts 14-17 and end users 21-25. As shown in FIG. 1, contacts 14-17 generally provide information to hub 12 and end users 21-25 generally receive information from hub 12, although a certain amount of the reverse communication is expected. Each contact 14 is an individual that can be a natural person or a corporate or other business entity. Each such contact 14, after an initial registration preferably provides its contact information to central hub 12 and then periodically may provide further information that updates such initial contact information. Each end user 21 typically will be a natural person (but instead may be a corporate or other business entity) who requests contact information for a specified individual contact 14 and then receives such contact information from hub 12.

Figure 2:
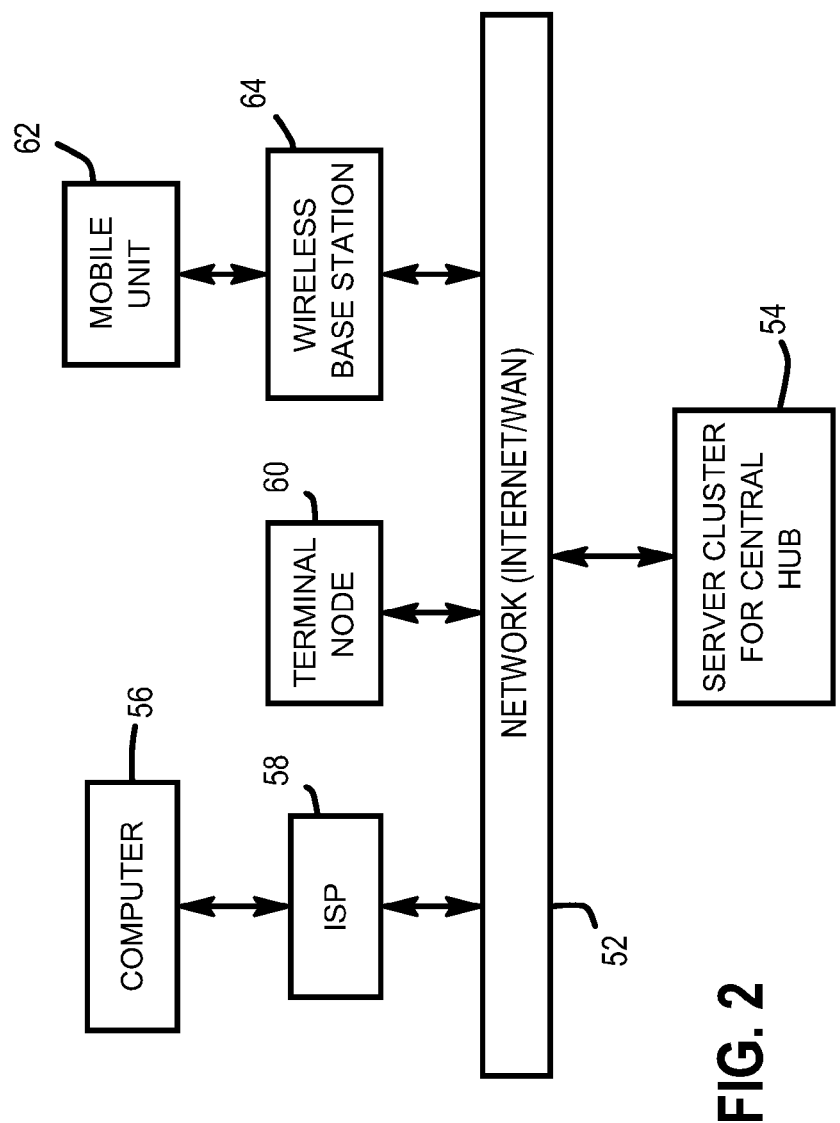
FIG. 2 is a block diagram showing the preferred implementation of the system illustrated in FIG. 1.

FIG. 2 illustrates a block diagram showing the preferred implementation of system 10. As shown in FIG. 2, all entities in system 10 communicate via a central network 52, which preferably is the Internet or other public network, but may instead be a WAN or other private network. In this embodiment, end users 21-25 and contacts 14-17 communicate with a server cluster 54 (which implements central hub 12) via network 52. Cluster 54 may comprise a single server, although generally will include multiple servers that are connected together using known load-sharing techniques and that access a common database.

As indicated below, end users 21-25 and contacts 14-17 may access server cluster 54 using any route that connects them to network 52. However, cluster 54 preferably provides a different interface depending upon whether a particular individual communicates with cluster 54 as an end user 21 or as a contact 14. In this regard, it is noted that a single individual may act at certain times in one of its capacities as a contact 14 and at other times in one of its capacities as an end user 21.

As shown in FIG. 2, each of end users 21-25 and contacts 14-17 may access server cluster 54 by connecting to network 52, e.g., using a computer 56 that connects through an Internet Service Provider (ISP) 58, via a node 60 that directly connects to network 52, or via a mobile unit 62 that wirelessly connects to a base station 64, which in turn connects to network 52.

Figure 3B:
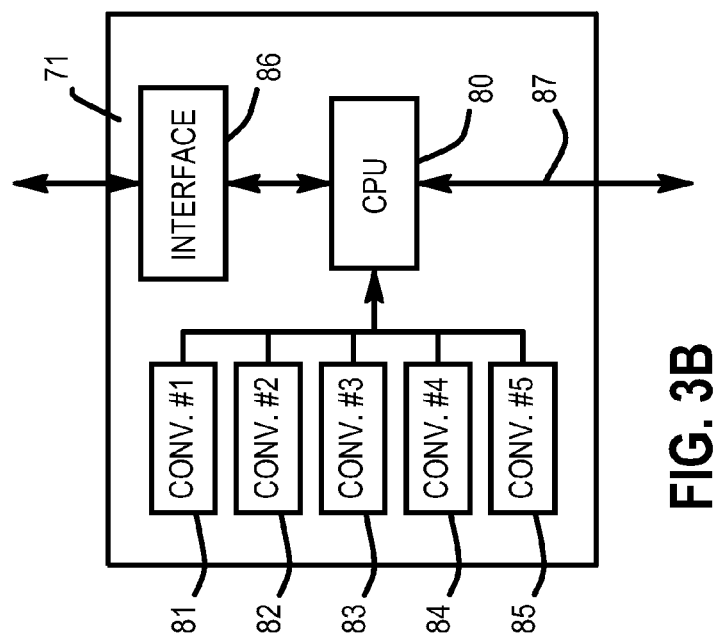
FIG. 3B is a block diagram of a single server in the server cluster illustrated in FIG. 3A.
Figure 3A:
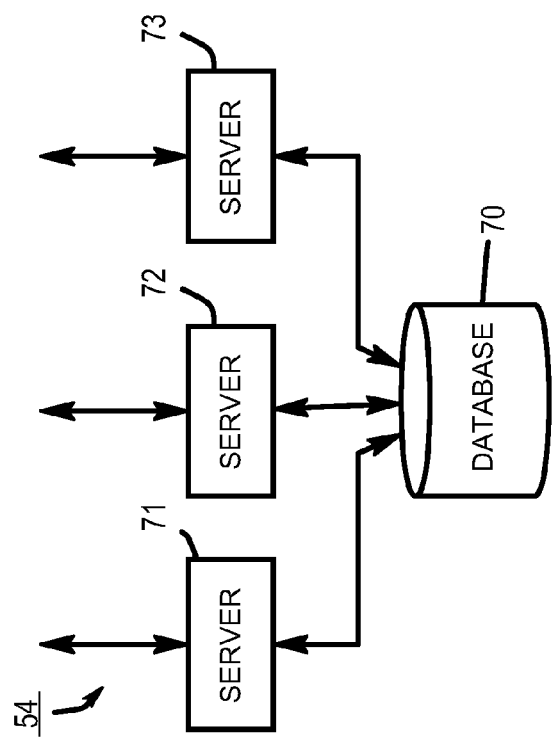
FIG. 3A is a block diagram showing a preferred implementation of the server cluster for the central hub of a system according to the invention.

FIG. 3A illustrates in more detail the preferred implementation of server cluster 54. As shown in FIG. 3A, cluster 54 includes multiple servers 71-73, each connecting to a database 70. According to the present invention, servers 71-73 may be configured identically. However, in embodiments where multiple different communication channels are utilized, each of servers 71-73 may be dedicated to a different channel and configured specifically for that channel. For example, server 71 may be configured to handle Internet traffic, server 72 to handle dial-up connections, and server 73 to handle wide area network traffic. Similarly, different types of servers that are all connected to the Internet may be utilized to handle different types of Internet communications (e.g., hypertext transfer protocol (HTTP), wireless application protocol (WAP) and other types of transmission control protocol/Internet protocol (TCP/IP) communications). The number and configurations of servers typically will depend upon expected traffic loads, server power and other engineering considerations known to those skilled in the relevant art. Where multiple servers are handling similar types of traffic, use of a load balancer is preferred.

Database 70 may consist of a single device, such as a redundant array of independent disks (RAID), or of multiple (preferably synchronized) devices (e.g., one dedicated device for each server 71-73). In any event, it is preferable that each server has access to the entire database 70 of contact information. Finally, it is noted that the various devices illustrated in FIG. 3A may be located at a single physical location or may be geographically disperse. However, it is preferable that all are accessible via a single address (i.e., at a single virtual location), or at least at a single address (or virtual location) for each different communication channel.

FIG. 3B illustrates a representative configuration of an individual server, e.g., server 71. As shown in FIG. 3B, server 71 includes a central processing unit (CPU) 80 that performs most of the processing for server 71 and that communicates with end users 21-25 and/or with contacts 14-17 via interface 86. Server 71 also accesses database 70 (not shown) via connection 87 to retrieve and store contact records. In connection with its communications with end users 21-25, server 71 (acting through CPU 80) accesses various format conversion routines 81-85 in order to convert the format of a requested contact record stored in database 70 to the selected format for each individual end user 21, as described below. Such conversion modules 81-85 may also be used for converting input data into the standard format for storage in database 70. In the preferred embodiment of the invention, all contact records are stored in the same format and, as a result, a separate format converter 81-85 generally will be necessary for each supported format other than the standard storage format. Format conversion routines 81-85 preferably are implemented entirely in software, but instead may be partially or fully implemented in hardware or firmware.

Typically, interface 86 is provided as a combination of hardware and software. In addition, different interfaces 86 may be provided depending upon who is contacting server cluster 54 and/or what communication channel is being used. Moreover, interface 86 may be configurable for each end user 21 and/or for each contact 14, based on information stored in database 70, as described in more detail below.

II. Contact Communications with the Central Hub

In the preferred embodiment of the invention, each individual contact 14 initially must register with hub 12 in order to obtain an account. Upon registration, contact 14 preferably is provided with a log-in name and a password to allow the contact 14 to input and then subsequently modify its contact information. In addition, during such registration the contact 14 preferably designates itself according to one of several different categories, such as: (i) a business entity; (ii) an employee or representative of a business entity; or (iii) a natural person who is unaffiliated with a business. Thus, a single individual might register multiple times for each of his, her or its separate capacities. As discussed in more detail below, these different categories preferably can be used: (1) as search criteria by the end users 21-25; (2) to modify the interface presented to contacts 14-17 and/or to end users 21-25; and/or (3) to determine the fields that initially are presented to, or may be utilized by, contacts 14-17.

Account registration for contact 14 preferably is performed via the Web, using conventional account registration techniques, and may require payment of a fee by contact 14. Upon registration, hub 12 sets up a file that includes a contact record for contact 14 that includes multiple different contact information fields. The contact record initially either is blank or includes information provided by contact 14 during the registration process.

In either event, contact 14 is permitted to supplement and/or modify such information during the time that its account remains current. Preferably, such information inputting/updating can be performed over the Web, which presently is believed to provide the best combination of: easy access to hub 12, capacity for providing simple and intuitive user interfaces, and relatively easy integration with hub 12 in a manner that can permit hub 12 to operate automatically without any human interaction for most day-to-day transactions. However, it also may be preferable to provide contacts 14-17 with alternate channels for providing and/or supplementing their contact information, e.g., via a dial-up telephone modem connection, by telephone contact with a live operator, or by faxing-in or mailing-in a printed form with the contact information completed. These alternate channels may be particularly helpful in situations where contact 14 does not have Internet access, although some will require human intervention at hub 12.

The file created for contact 14 during the registration process preferably also includes a unique assigned identification code for contact 14. This code may be assigned by hub 12 as an arbitrary alphanumeric or may be selected based on input from contact 14 (e.g., a preferred code). It may be a mnemonic, a specific item of the contact information for contact 14 (e.g., email address or telephone number), or any other code. In the preferred embodiment of the invention, the code is not part of the contact information for contact 14, as that information is subject to change over time. A mnemonic or other code selected by the individual contacts 14-17 is preferred, as such a code permits personalization and therefore may be easier for end users 21-25 to remember. In such a case, the selection of the code for a particular contact 14 may be performed in a similar manner as the selection of e-mail addresses by end users who are registering with an e-mail service provider (e.g., allowing the end user to select different codes until one is identified that is not presently being used by the system).

If a portion of contact 14's contact information is used as the unique assigned identification code, generally it will be preferable to use the same field for each of contacts 14-17 that connect to hub 21, in order to make use of the system 10 by the end users 21-25 more intuitive. For example, if hub 12 establishes the rule that each contact's unique assigned identification code is that contact's email address and an end user 21 knows that a particular contact 14 is registered with hub 12, then it is a simple matter to determine what contact 14's unique assigned identification code is.

However, this approach is not critical and other techniques may be used to highlight the assigned identification code for a contact 14. For example, on printed business cards the portion to be used as the identifier can be highlighted in bold, italics or underlining or by placing a particular symbol next to the portion of the contact information that is to be used as the unique identifier.

Moreover, as described below, various techniques can be implemented for permitting flexible choices of non-assigned but de facto unique identifiers. For example, by using the contact record display interface described below and illustrated in FIG. 10, the end user 21 is provided with great flexibility in identifying different contacts 14-17.

Figure 4:
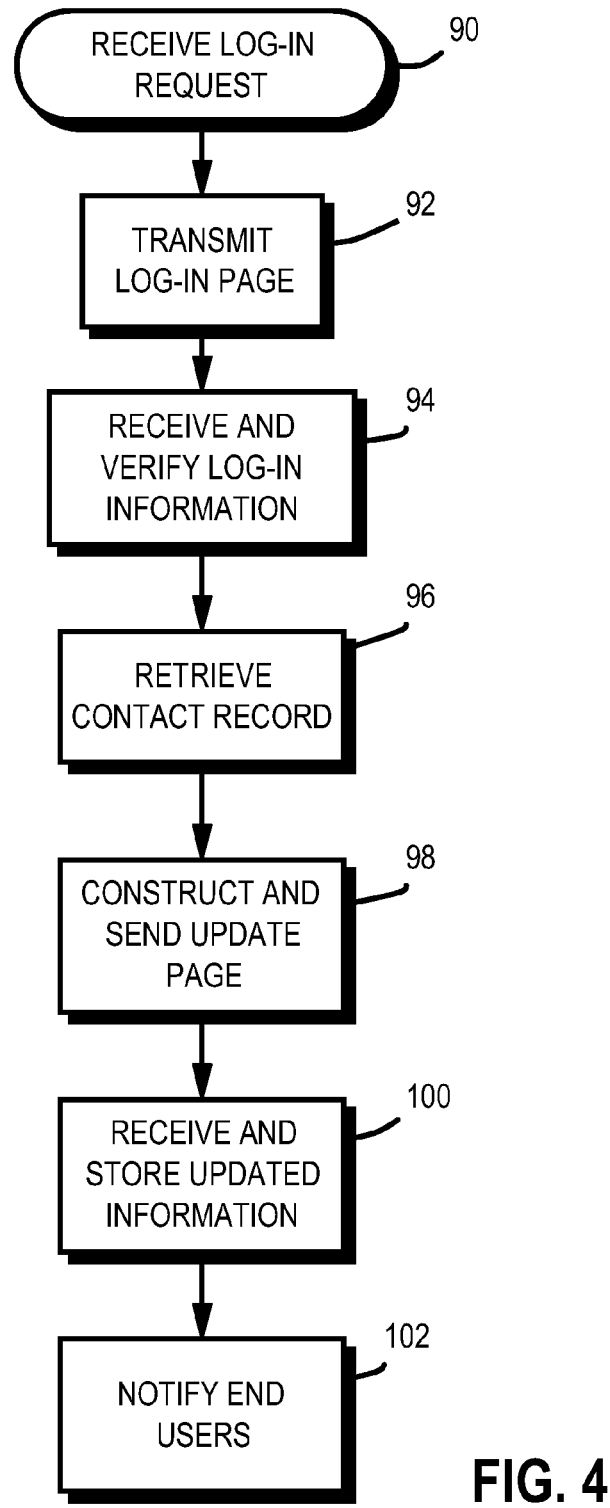
FIG. 4 is a flow diagram showing processing by the central hub in connection with a contact record modification event, according to a representative embodiment of the present invention.

FIG. 4 illustrates a flow diagram showing process steps that may be automatically (i.e., without human interaction) implemented by hub 12 in order to provide for contact information inputting and modification by contacts 14-17. Initially, in step 90 central hub 12 receives a log-in request from a contact 14.

In response, in step 92 hub 12 retrieves or generates a log-in page and sends that page to contact 14. Preferably, the communications between hub 12 and contact 14 are via the Internet and the page is sent in hypertext markup language (HTML) format and includes fields for a user name and password. In addition, such page may include Java applets or other platform-independent script. However, any other communication channel and/or format may be used instead (or in addition).

Upon receipt of the log-in page, contact 14 types or otherwise fills in the log-in information fields, and then causes that information to be transmitted back to hub 12, e.g., by clicking "send" or "next" on his or her browser display. In response, in step 94 hub 12 receives and verifies the log-in information.

Assuming that the log-in information for contact 14 is verified in step 94, then in step 96 hub 12 retrieves any stored contact information for contact 14 from its database 70. That contact information is then used to populate a formatted contact information display interface for contact 14 as follows.

In step 98, hub 12 retrieves (or generates on-the-fly, based on stored display formatting preference information for contact 14) a formatted contact information display interface for contact 14. Once again, this display interface preferably is in the form of an HTML page and may include Java or other platform-independent script (e.g., to implement the display-format-altering functionality described below).

Figure 5:
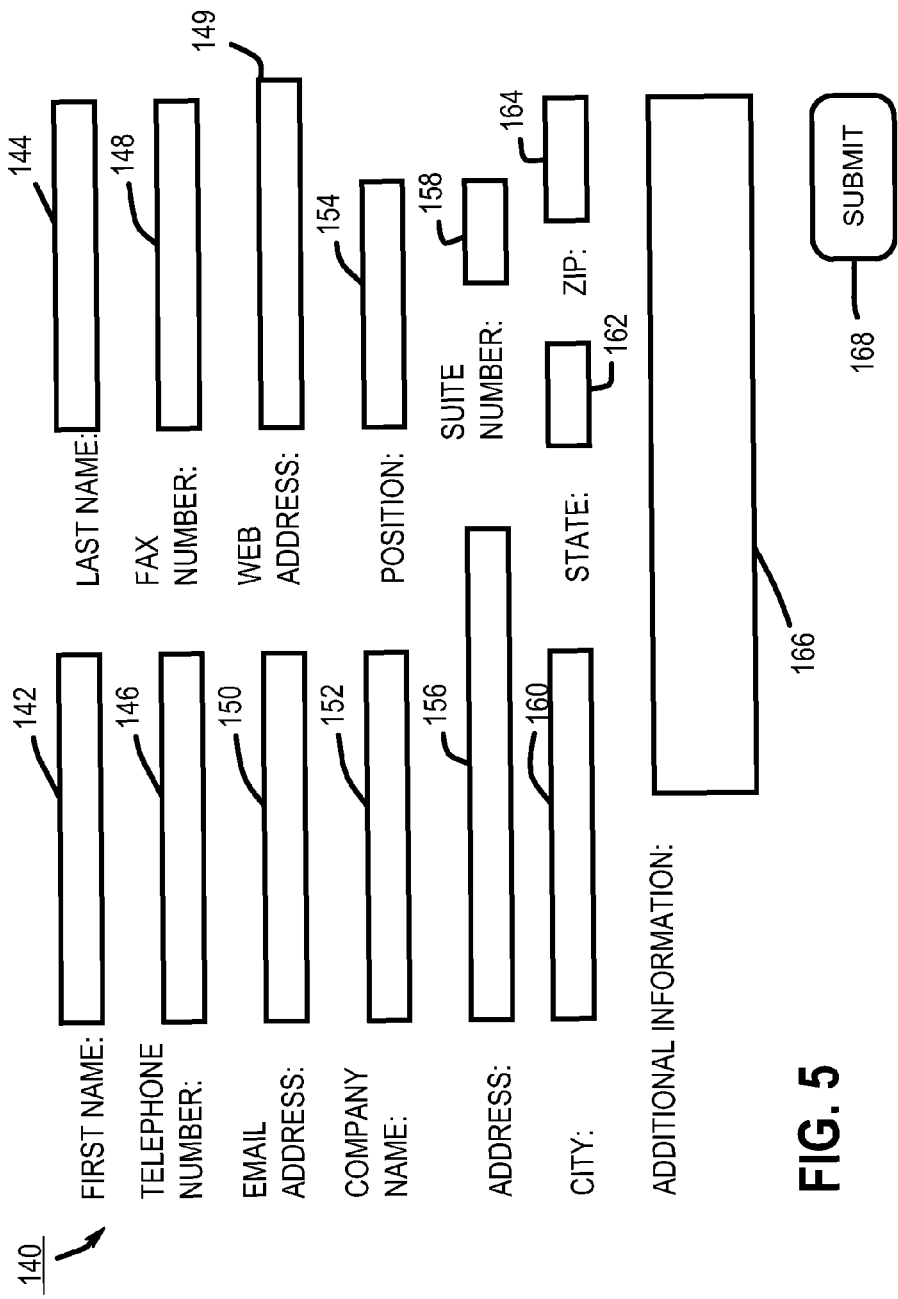
FIG. 5 illustrates a representative user interface for use by a natural person contact in order to input and/or modify his or her contact information.

In a representative embodiment of the invention, the contact information page has the format 140 illustrated in FIG. 5, with different fields for different items of the contact 14's contact information. Thus, for example, interface 140 includes: a first name field 142, a last name field 144, a telephone number field 146, a fax telephone number field 148, an email address field 150, and so on. Preferably, the display formatting for page 140 has been customized for the contact 14 and stored in the file for contact 140 (along with the contact record for contact 14) in database 70. However, it also is possible to use the same formatting across all contacts 14-17, or to use the same formatting for each category (e.g., business, business employee or personal) of contacts 14-17.

In addition to the other contact information fields, each contact 14 preferably also is provided with the option of including information in an "additional information" field 166. This field 166 allows each contact 14 to include any additional information that it believes might be relevant or helpful to end users 21-25, but for which no separate field is provided. Thus, when the additional information field 166 is provided to an end user 21, the end user 21 generally will have the ability to search his or her contact records to identify any contacts 14-17 that contain specified search terms. For example, a particular contact 14 might include the words "mortgage broker" in field 166 to describe his or her services. After an end user 21 has downloaded and stored this contact record into his or her electronic address book, a later search of the contact records in end user 21's electronic address book for the words "mortgage broker" will identify the contact record for contact 14.

More preferably, in addition to permitting entry of plain text in field 166, hub 12 also allows contact 14 to include in field 166 a link to a Web page with additional information regarding contact 14, logo graphics, and/or any other types or formats of information. However, in the preferred embodiment of the invention, the entire contact record for each contact 14 is kept to a small size. As a result, inclusion of audio, video and/or other types of data-intensive information, as well as any large blocks of text or other information whose physical size would not normally allow it to fit within the user interface display for a typical PIM, preferably is performed via a link (e.g., a Web site link), rather than by direct embedding of such information.

In this manner, for example, a Web page link that is included in field 166 may be different then the Web page address or link that is included in field 149. Specifically, while the address or link in field 149 generally will pertain to the company as a whole, the address or link in field 166 might pertain more specifically to the individual contact 14. Alternatively, a separate dedicated field might be provided for a link to such a personal Web page.

It is further noted that in certain embodiments of the invention, hub 12 makes available template-based or fully customizable Web pages for the use of its registered contacts 14-17, and provides simple interfaces for including links to such Web pages in the contact record for each contact 14. As a result, contacts 14-17 can easily include additional information regarding themselves, such as a full resume or other additional text, and/or any other information that ordinarily is not included in a contact record, such as audio, video, animated graphics and/or photographs.

After incorporating the contact information into page 140, hub 12 sends the page to contact 14. On the other hand, if this is the first time that contact 14 has logged into hub 12, a blank page 140 having a generic format (which may or may not be category-specific) preferably is sent to contact 14.

Upon receiving the page 140, contact 14 edits any fields that it wishes to change, supplements page 140 with any additional information, and then clicks "submit" button 168 to transmit the new and/or changed information back to hub 12. Generally, the entry or a changing of information will be performed by typing into the various fields of page 140.

As indicated above, contact 14 preferably also is given the ability to alter the format of page 140. Thus, in addition to modifying his or her contact information, prior to submitting the form, contact 14 might also customize the generic format (or previously customized format) of page 140. In this regard, for example, contact 14 initially might be provided with a generic contact information page (e.g., having the format shown in FIG. 5), but would be allowed to alter the number, types or arrangements of the fields, e.g., using drag-and-drop techniques and/or drop-down menus to move fields, to create new fields and/or to delete existing fields. As indicated above, such functionality can be provided by JavaScript embedded in the downloaded Web page.

For instance, contact 14 might decide to select and drag as a block the telephone number field 146, fax number field 148 and email address field 150 to just below the city 160, state 162 and zip code 164 fields. In this case, reformatting preferably occurs automatically to fill in the gap and to make space available at the new destination. In addition, if contact 14 is self-employed or is using his or her contact information for personal or social contacts, she might decide to delete the company name field 152 and the position field 154. Still further, contact 14 preferably is allowed to add new fields from an auxiliary list of fields or to custom-create new fields. In this manner, contact 14 might, for example, add fields for a pager telephone number, one or more mobile telephone numbers, and alternate email addresses. In the preferred embodiment of the invention, once the contact information format 140 has been altered by the contact 14 and submitted to hub 12, that same format is used in any subsequent communications between hub 12 and contact 14 (until further modified by contact 14). It is noted that such changes to the format of page 140 generally will not affect the format in which contact records are provided to various end users 21-25. Rather, that format preferably is prescribed by the individual end user 21 or his or her PIM.

Figure 6:
FIG. 6 illustrates a representative user interface for use by a business entity contact in order to input and/or modify its contact information.

In the embodiments described above, page 140 initially has a generic format that may be customized by each individual contact 14 according to his or her preferences and needs. Generally, however, it will be preferable to have more than one generic format, such as one for an employee of a company (referred to herein as an e-business-card), one for a business itself where designation of an individual contact within the company is not desirable (referred to herein as an e-flyer), and one for a natural person who is not affiliated with any company or who does not want this particular contact information record to indicate such an affiliation (referred to herein as an e-calling-card). A sample contact user interface for an e-flyer 170 is illustrated in FIG. 6, in which a Web address field 172 is included but no personal-identification information is. Instead, all contact information is intended to be general contact information for the company as a whole. Thus, a store chain might register for an e-flyer account or for a number of different e-flyer accounts, one for each store in the chain.

It is also noted that an individual might have multiple contact information registrations with hub 12, including, for example, one or more e-business-cards (e.g., if he or she works for multiple different companies), one or more e-flyers (e.g., if he or she owns multiple businesses), and/or one or more e-calling-cards (e.g., one with more information for close friends and one with less information for casual acquaintances).

Returning to FIG. 4, in step 100 hub 12 receives the updated information from contact 14 and stores that information into database 70. More specifically, the updated information might include changes to contact 14's contact information and/or changes to contact 14's preferred format for future displays of page 140. If the storage format used by hub 12 is different then the format in which such information was received from contact 14, then any necessary conversion preferably is performed first. Such conversion typically will be relatively straightforward and will involve the application of simple mechanical rules. Alternatively, as hub 12 controls the format in which information is received from each contact 14, that format can be made identical to the format in which hub 14 stores contact records in database 70.

In the preferred embodiment of the invention, the contact records are stored in database 70 in a standard format that allows for unambiguous identification of the individual fields by applying pre-specified mechanical rules. However, different formats may be used for the different categories of contacts 14-17. In addition, the storage format may be arbitrary, but more preferably corresponds to the format used by a PIM or stand-alone interface program provided by hub 12 or the PIM that is most widely used by the end users 21-25, thereby obviating the need, in many instances, to convert the format of contact records prior to transmitting them to the end users 21-25.

Upon receipt of any updated contact information, optionally in step 102 various end users who previously have downloaded contact information for contact 14 may be contacted automatically in order to either automatically update their electronic address books or to query them as to whether they would like their address books updated based on the new information. A technique for implementing such a process is described in more detail below in connection with FIG. 13.

In the embodiment described above, the contact 14 enters or modifies his or her contact information using a Web page interface. However, any other user interface may be used instead. For instance, contact 14 might simply create or maintain a contact record for himself or herself in his or her PIM and then email that contact record to hub 12 as an initial submission of contact information or when an update is desired. In such a case, hub 12 preferably converts the received contact record into a standard format and then stores it into database 70, although it is also possible to store it in the format in which contact 14 provided it. In either event, processing of such emails preferably is fully automated by hub 12. Preferably, the email submitted by contact 14 includes a login name and/or password so that hub 12 can verify the origin of the email. Still further possibilities exist if the terminal used by contact 14 includes special-purpose software that is configured to directly communicate contact information to hub 12. However, because changes to any given contact 14's contact information generally will occur infrequently, updates preferably are communicated via the Web.

III. End User Communications with the Central Hub

The foregoing description pertains to the inputting and updating of contact information by various contacts 14-17. At the same time, various end users 21-25 will be communicating with hub 12 in order to obtain the contact information input by contacts 14-17. Generally speaking, an end user 21 will provide either a contact identification code or search criteria to hub 12. Based on that information, hub 12 will: retrieve contact information for the indicated contact, format the contact information based on the needs of the end user 21, and transmit the formatted contact information to the end user 21. Software at the end user 21's terminal preferably automatically saves and/or displays the received contact information based on settings selected by the end user 21.

At the outset, it is useful to describe certain background concepts and arrangements that are contemplated in connection with the end user 21's use of a system 10 according to the present invention. The hub-based system 10, as shown in FIG. 1, permits each end user 21 to query hub 12 for contact information regarding any of the contacts stored in hub 12's database 70. Each such query includes a contact identifier, which may be a unique identifier, a non-unique identifier that is used by hub 12 as a search term, or a set of search terms.

Various configurations may be employed by end user 21. In each such configuration, a terminal 200 is used by end user 21 to connect to hub 12. Thus, terminal 200 generally will be networked or network-ready, and may be a desktop computer, laptop computer, PDA, wireless telephone or any other type of computer or device.

At least two different types of configurations are contemplated by the present invention. In the first, illustrated in FIG. 7A, a personal information manager (PIM) that includes an electronic address book is installed on terminal 200, and most or all of the special-purpose end-user-side functionality described below (e.g., the capacity for direct communication with hub 12 and the types of interfaces described below) is implemented by PIM 204. In this regard, PIM 204 may be a standard application that has been provided by or approved by hub 12 or a commercial PIM that has been modified to include such functionality. PIM 204 optionally also may include any or all of a calendar, a notepad, an email application, a task manager and/or various other features. In addition to communicating with hub 12, PIM 204 on terminal 200 optionally interfaces with other devices such as portable device 202 (which might, for example, be a PDA), as described in more detail below.

Figure 7A:
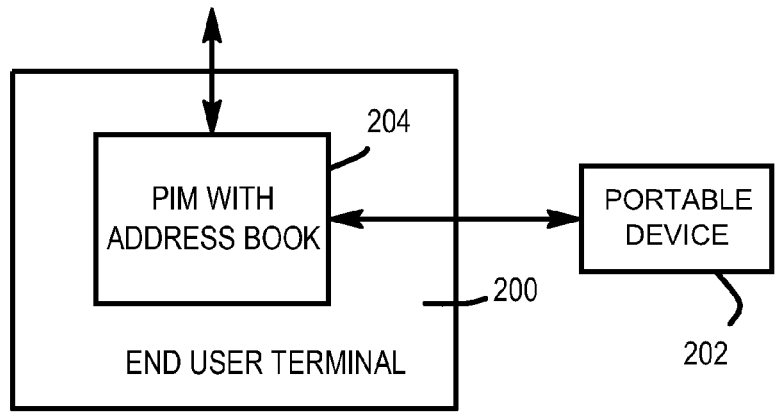
FIG. 7A illustrates a representative configuration of an end-user terminal having a personal information manager that includes all functionality necessary to perform the techniques of the present invention.

The type of configuration shown in FIG. 7A also is used in connection with a significantly different embodiment of the invention. In this embodiment, much of the special-purpose functionality described below is not available, and PIM 204 is implemented as a conventional PIM that generally will only communicate indirectly with hub 12. Thus, for example, in this embodiment an end user 21 might submit requests for contact records via a Web interface and receive such contact records as e-mail attachments and/or as FTP-transferred files that can then be opened by PIM 204.

Figure 7B:
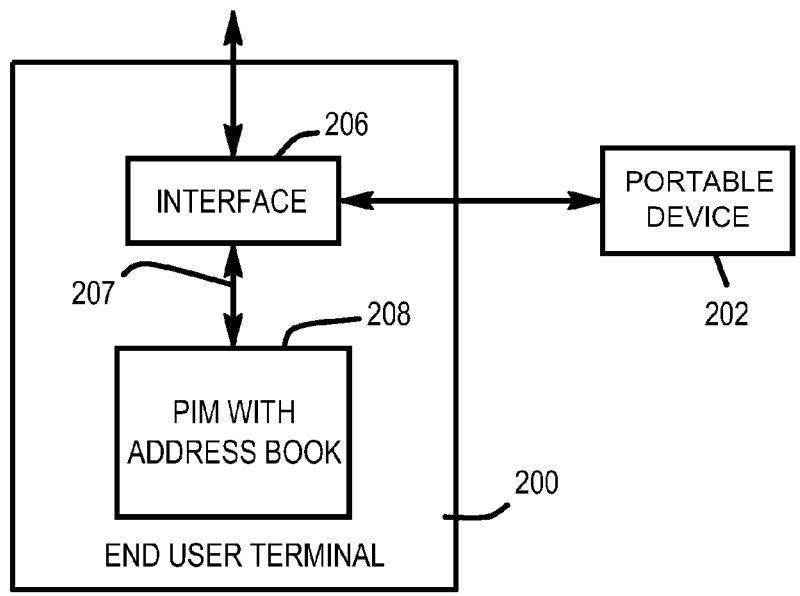
FIG. 7B illustrates a representative configuration of an end-user terminal which requires a separate interface program to implement some or all of the functionality necessary to perform the techniques of the present invention.

An alternative configuration is illustrated in FIG. 7B, in which a PIM 208 (which may be a conventional PIM) is used in conjunction with an interface program 206 that has been provided or approved by hub 12. In this configuration, interface program 206 provides an interface between hub 12 and such conventional PIM 208, allowing the end user 21 to continue using the PIM 208 with which he or she is accustomed while still obtaining all of the benefits of the present invention, until such time as his or her conventional PIM 208 can be modified to provide such features (i.e., converted to or replaced with a PIM 204). Although a communication link 207 between PIM 208 and interface program 206 is illustrated in FIG. 7B, it will become clear from certain embodiments described below that a direct communication link between the two programs often is not necessary (e.g., where contact records are received as email attachments or where interface program 206 directly modifies the address book file for PIM 208 without opening PIM 208).

The following discussion generally assumes that each end user 21 previously has registered with central hub 12, and that in the registration process has provided hub 12 with information regarding the type and version of his or her PIM 204 and/or 208 and/or of his or her interface program 206, as applicable in the embodiment, as well as the communication channel and address on that channel to which contact records are to be sent. Alternatively, end user 21 might transmit any of such information in connection with each request for contact information. In either case, hub 12, the PIM 204 or 208, or the stand-alone interface program 206, may instead include functionality to automatically detect the types of programs (and the versions thereof) used by terminal 200 and/or to automatically transmit such information to hub 12 (e.g., by automatically embedding such information into a search request). In any event, hub 12 preferably will have the knowledge to correctly format and appropriately transmit any contact information requested by end user 21 (assuming that the end user 21's PIM and the communications channel used by end user 21 are in fact supported by hub 12).

In addition, during the registration process, end user 21 and hub 12 preferably also have agreed upon a unique identification code with which hub 12 may identify end user 21. Also, end user 21 preferably provides hub 12 with certain of end user 21's preferences, as described in more detail below. Such preferences may be communicated during the registration process or in connection with each contact information request.

In order to simplify the following discussion, it generally is assumed that all of the special-purpose functionality in connection with the present invention is performed either by PIM 204 in the embodiment illustrated in FIG. 7A or by separate stand-alone interface program 206 in the configuration illustrated in FIG. 7B. However, it should also be understood that in the configuration shown in FIG. 7B such functionality may instead be performed partly by interface program 206 and partly by PIM 208.

Figure 8:
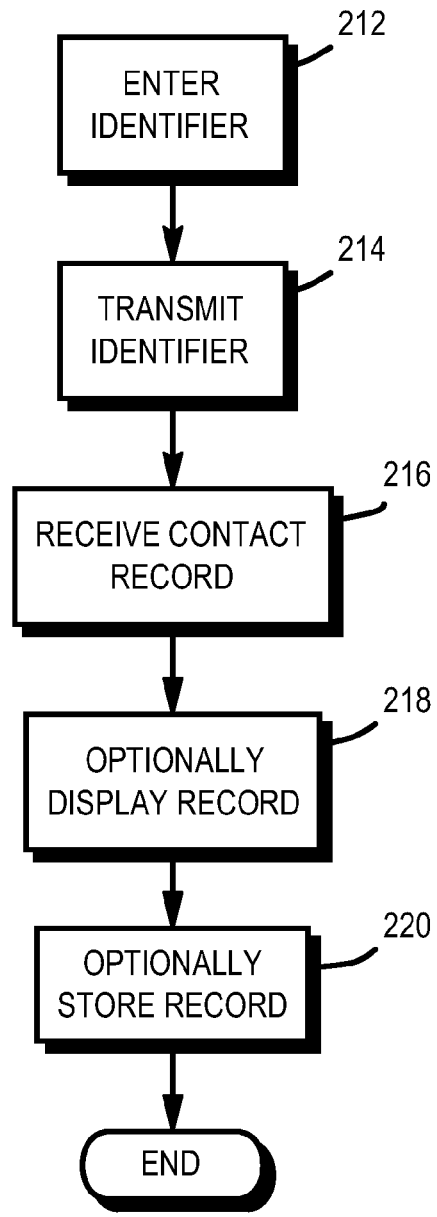
FIG. 8 illustrates a flow diagram for explaining processing by an end user terminal when requesting and receiving contact records, according to a representative embodiment of the present invention.

FIG. 8 illustrates a flow diagram for explaining the general process steps executed by terminal 200 according to a representative embodiment of the invention. As will become apparent below, each general step shown in FIG. 8 can be implemented in a variety of different ways, depending upon the particular embodiment of the invention. In addition, these various possible implementations can be combined in any given embodiment, allowing the end user 21 to have significant flexibility in obtaining and using contact information. The processing according to the steps of FIG. 8 typically will be executed by PIM 204, interface program 206 and/or PIM 208.

However, it is also possible for certain of such functionality to be executed by software running on portable device 202, depending, for example, upon the particular embodiment of the invention and the particular options selected by end user 21 at the time. For instance, end user 21 might configure portable device 202 to accept entry of contact identifiers and to download those contact identifiers to terminal 200 at a later time, for submission by terminal 200 to hub 12. Alternatively, portable device 202 may submit contact record requests to hub 12, receive the corresponding contact records, and then later transfer some or all of such records to terminal 200.

Initially, in step 212 a contact identification code or search criteria pertaining to a contact (in either case, referred to herein as a contact identifier) is entered at terminal 200. Such entry may be accomplished in a variety of different ways according to the present invention, and the method for input may depend upon the type of contact identifier. Also, as will become clear below, the contact identifier may uniquely or non-uniquely identify the desired contact 14. The following paragraphs describe a representative sampling of such contact identifier input options.

Figure 9A:
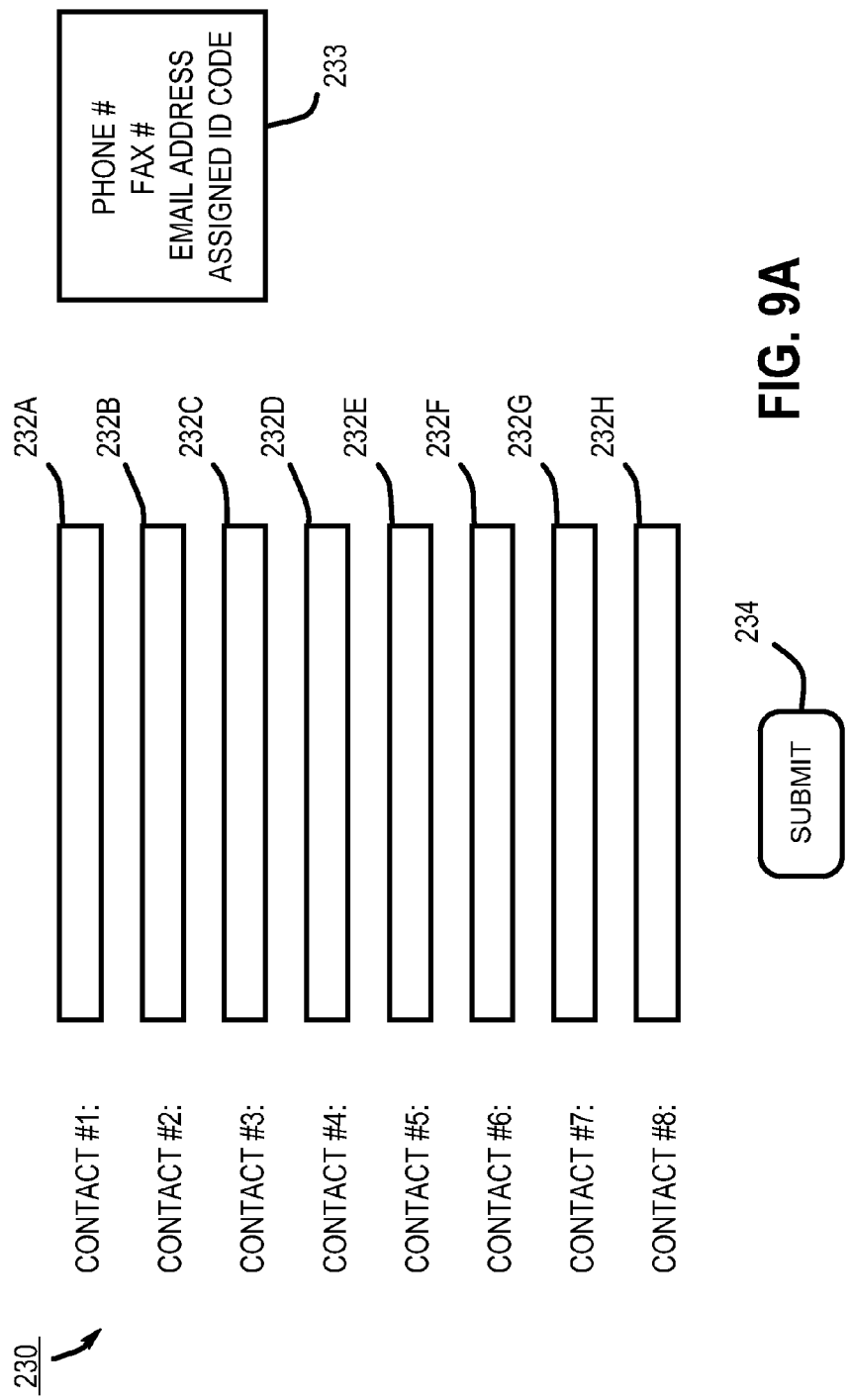
FIG. 9A illustrates a representative end user interface for inputting multiple unique contact identification codes.

In this regard, the end user 21 preferably is given a variety of user interface and inputting choices. One possible interface 230 is shown in FIG. 9A, and is referred to herein as the batch interface. Batch interface 230 has multiple fields for entering, and then submitting together as a group multiple different corresponding contact identifiers (preferably in the form of contact identification codes). When batch interface 230 is used, it is preferable that each contact identifier uniquely identifies the desired contact 14. As a result, after the contact identifiers are entered into fields 232A-H and "submit" button 234 is clicked, a corresponding number of contact records can be expected to be returned to end user 21. Generally, when the batch interface 230 is utilized, the end user 21 will have selected, or the software on terminal 200 will have been pre-configured, to automatically store (or to automatically display with an option to store, thereby allowing end user 21 to preview and then store if correct), the contact records returned by hub 12.

In this manner, an end user 21 can collect a group of contact identifiers and then input (or have an assistant input) the corresponding contact information into end user 21's address book at the same time. For example, an end user 21 might collect business cards imprinted with unique identification codes for their corresponding contacts 14-17 (which may be an assigned unique identification code or a field in the contact information that functions as a unique identifier), input those identifiers into fields 232A-H of interface 230, and then click the "submit" button 234. In response, hub 21 automatically downloads the corresponding contact information into terminal 200.

As noted above, the unique identification code could be a separate code assigned by hub 12 that is printed on the business cards or could be one of the contact information fields shown on the business card. With regard to this latter option, the field for the unique identifier could, for example, be: (i) fixed across all registered contacts 14-17, (ii) determined by end user 21 by selecting a setting that would be used for all contact identifiers that end user 21 submits, or (iii) determined by end user 21 for each individual identifier that end user 21 submits.

Thus, in a representative embodiment, display 230 includes a menu 233 that allows end user 21 to select any of the listed fields (e.g., telephone number, fax number, email address or assigned identification code, in this embodiment) to be used as the identifier. In this regard, menu 233 may be provided as a drop-down menu that opens upon right-clicking one of the fields 232, a fixed menu that is constantly displayed, or in any other manner. Also, depending upon system and/or user settings, a single selection from menu 233 may apply to all fields 232 or a separate selection may be performed for each different field 232A-232H.

In certain of the preceding embodiments, the end user 21 is permitted to select which field of the contact information is to be used as the unique identification code. Alternatively, it is possible to permit contact 14 to designate that field, such as shown in FIGS. 9B and 9C.

Specifically, FIG. 9B illustrates a printed business card 236 that presents the usual contact information for a particular contact 14. In addition, business card 236 also has one of its information fields, the field for contact 14's direct telephone number 237, marked with a symbol or logo. In the present example, the symbol is a "¤". However, it should be understood that any other symbol or logo may instead be used. Preferably, however, the logo used is one that clearly identifies hub 12 to the end users 21-25. Thus, in this case, upon seeing the "¤", end user 21 immediately knows that contact 14 is registered with hub 12 and, upon observing the position of the "¤", also knows that the telephone number 237 (i.e., 3105551234, with or without hyphens or parentheses, which preferably are ignored by the system 10 of the present invention) should be entered into field 232A in order to obtain the contact information for contact 14. Similarly, when presented with business card 238 (shown in FIG. 9C), end user 21 knows that the corresponding contact 15 (i.e., "Jack Jones") is registered with hub 12 and that the email address 239 should be entered into field 232B in order to obtain the contact information for contact 15.

In the event that the foregoing designation technique (as illustrated in FIGS. 9B and 9C) is not used, it is nevertheless preferable to include a logo or other symbol of hub 12 somewhere on the business cards for contacts 14-17. This will indicate that such contacts 14-17 are in fact registered with hub 12. Where field designation is not desired, the logo or symbol may be located, for example, in one of the corners of contact 14's business card.

In a further embodiment of the invention, the type of information to be entered into each field 232 need not be specified by either end user 21 or contact 14, but rather is detected automatically by terminal 200 or by hub 12. Such detection may be as simple as, for example, restricting the entered information to telephone numbers or email addresses and then determining whether the information entered in a particular field 232 contains a "@" symbol. If so, then that field is determined to contain an email address, and so all email addresses of contacts 14-17 should be searched by hub 12 in an attempt to find the entered character string. If not, then it is determined to be a telephone number, and so all telephone numbers of contacts 14-17 should be searched.

Rather than requiring the end user 21 to type each contact identifier into interface 230, it is also possible to input the identifier in other ways. For example, a contact 14 may choose to provide the identifier on contact 14's printed business cards in an easily computer-readable manner (e.g., using a barcode or similar printing technique that is specially adapted to optical scanning). Assuming that multiple contacts 14-17 adopt such a technique, an end user 21 could input the contact identifiers for an entire stack of printed business cards in a matter of seconds. In such an embodiment, user interface 230 may still be used, with a corresponding alphanumeric code appearing in each field 232 as the identifier on each business card is scanned.

Alternatively, where such scanning is accommodated, any other interface may be used. For example, it may even be preferable to omit any visual interface for inputting the identification codes, such as by having terminal 204 or device 202, as appropriate in the given embodiment, produce an audible beep when an identification code has been recognized (or has been recognized with a sufficient level of confidence).

An alternate interface 250 for inputting a contact identifier is illustrated in FIG. 10. Here, the contact identifier generally will include a set of search criteria. Interface 250 is referred to herein as the contact record display interface, and it preferably contains all or substantially of the fields normally displayed by end user 21's address book when displaying or creating a contact record, arranged in exactly or substantially the same manner as end user 21's address book when displaying or creating a contact record. As a result, end user 21 will already be comfortable with the user interface 250. However, this feature is not critical, and often will not be provided when a separate interface program 206 is used to provide interface 250. In any event, it is preferable that the contact record display interface 250 be formatted consistently (e.g., identically) for different queries, thereby facilitating end user 21's use of the system.

As shown in FIG. 10, contact record display interface 250 is provided with an identification code field 252 that can be used to input a unique assigned identification code for the desired contact 14. Alternatively, end user 21 may input a portion (preferably, any desired portion) of the contact information for the desired contact 14 in the contact information fields of display 250. Generally speaking, certain of such contact information fields also can be expected to function as a unique identifier. For instance, inputting only the email address for desired contact 14 generally will uniquely identify contact 14 to hub 12. On the other hand, entering other combinations of information into such contact information fields will only possibly uniquely identify the desired contact 14, and instead may result in multiple matching contact records. For example, merely entering the first and last name of the desired contact 14 might, but generally will not, uniquely identify desired contact 14.

Interface 250 may be implemented in connection with any desired additional search functionality. For instance, as shown in FIG. 10, interface 250 is provided with radio buttons 255 and 256 that permit end user 21 to select how the entered contact information is to be interpreted by hub 12. In this regard, if button 255 is selected, then each field must match identically the information stored for that field by hub 12. This option may be preferable where end user 21 is entering telephone numbers or email addresses where only exact matches are desired. On the other hand, if button 256 is selected, then all records containing the strings or string fragments (depending upon the embodiment and/or upon user settings) entered by end user 21 in the corresponding fields are to be retrieved. This option may be preferable, for example, where end user 21 has partial contact information and wants to input all such information and perform a search for the desired contact 14. Similarly, additional controls may be provided so that end user 21 may select, for example, searching for phonetic equivalents, treating certain entered characters as optional, and/or permitting or not permitting use of certain search techniques (e.g., Boolean operators, wild cards, etc.).

With regard to such searches, conventional searching techniques preferably are accommodated. These include, but are not limited to: wildcards that can represent one or any number of characters (sometimes represented by an asterisk (*)), truncation symbols which indicate that any number of characters can be appended to the end of a string (sometimes represented by an exclamation point (!)), Boolean operators (such as AND, OR, NOT and XOR), and multiple levels of parentheses.

In still further embodiments, described in more detail below, end user 21 may input a unique identification code corresponding to the desired contact 14 by clicking on a link or shortcut that is included in any of: a Web page, an email message or any other electronic message or document. As used herein, the term "clicking on" is intended to encompass all forms of designation, including, for example, double-clicking, left-clicking with a mouse or touching with a light-sensitive pen or on a touch-sensitive screen.

In the preceding embodiments, end user 21 is permitted to enter search information in a field-based system. Alternatively, or in addition, end user 21 might be permitted to enter search information without regard to field. For example, end user 21 might enter a character string, and any contact record that includes that string in any field would be retrieved by hub 12. Still further, end user 21 can be provided with the option of utilizing Boolean operators across fields (e.g., searching for a telephone number, or portion thereof, that that is included in the contact's direct telephone number field OR in the contact's fax number field).

Returning to FIG. 8, after the contact identifier has been entered, in step 214 it is transmitted to hub 12. In this regard, step 214 may be initiated in a different manner for each different manner of entering the identification code of, or search criteria for, contact 14. For example, when using interface 230 transmission is initiated by clicking the "submit" button 234. When using interface 250 it is initiated by clicking the "submit" button 254. Alternatively, it may be initiated by clicking on a link for contact 14 that it is included in an e-mail from contact 14, in a Web page, or in any other electronic document.

In any event, such initiation preferably causes terminal 200 automatically to construct and transmit to hub 12 a message appropriate to the communication channel being used (e.g., a TCP/IP message for Internet communications). Such a message preferably includes the entered contact identification information and/or search criteria, as well as a return address and the unique identification code for end user 21. The message also might include location information for terminal 200, e.g., pre-stored by end user 21 or generated via an on-board global positioning system (GPS). All of such information preferably is in a standard format previously agreed-upon between terminal 200 and hub 12.

More preferably, such standard format enables central hub 12 to automatically (i.e., without human intervention) interpret the transmission, by applying simple mechanical rules, as a request for contact information that corresponds to the transmitted contact identifier. More detail regarding such formats is set forth below.

The timing and the manner in which such information is transmitted, as well as whether any preliminary steps are required prior to actual transmission, will vary from embodiment to embodiment. Where end user 21 is inputting one or more contact identifiers directly into terminal 200, which is connected to the Internet at the time of such entering, typically all that will be necessary is to click on the "submit" button (e.g., 234 or 254). However, other embodiments and/or situations might require additional steps.

For example, in certain embodiments of the invention, end user 21 enters contact identifiers (e.g., by typing, writing or scanning) into a portable device 202, such as a PDA that is not connected to the Internet or any other network. Instead, the entered contact identification information is merely stored into portable device 202 at that time. Later, when portable device 202 is synchronized with, or otherwise in communication with, terminal 200, the contact identification information is transferred to terminal 200. That contact identification information may then immediately be transmitted to hub 12 by terminal 200, or terminal 200 may store the contact identifier(s) until a later time, such as until terminal 200 connects to the Internet (or other communication network) or until end user 21 opens his or her PIM 204 or interface program 206. In any case, the transfer to hub 12 might be automatic, without any further input from end user 21, or instead terminal 200 might prompt end user 21 with a message that it has stored contact identifiers and a query as to whether end user 21 would like to obtain the contact information at this time, in which case only an affirmative response would trigger transfer of the contact identifier(s).

Similar options with regard to the timing of the transfer exist when end user 21 has directly input the contact identifier(s) into terminal 200. In either event, the selection of the appropriate option may depend upon whether terminal 200 presently is connected to the Internet or other usable communication network and/or upon what settings have been selected by end user 21.

As indicated above, the actual transfer of the contact identifier(s) preferably occurs over the Internet, although other communications networks and/or channels may be used, such as by directly using the PSTN in connection with a dial-up connection, by using a wireless connection to a public wireless service provider, and/or by using a wide area network (WAN) or a hard-wired or wireless local area network (LAN).

The format used to transmit the contact identifier(s) and/or search criteria may vary based on the type of information that comprises such identifier(s) and/or search criteria. For example, if the identifier(s) always will be the same type of information (e.g., the assigned uniquely identifying code), then in general the format may only require separators between the identification information for different desired contacts 14-17. Thus, the following may be transmitted:

abc@acme.com/def@isp.com/xyz@big.com where email addresses are used to identify the desired contacts 14-17 and the slash (/) mark delimits different contacts 14-17.

On the other hand, if the contact identifier(s) include different types or fields of information selected by end user 21 (e.g., using the menu 233 for each different contact identifier entered into interface 230, or using a portion of the contact information for contact 14, as described above in connection with interface 250), then the format may require use of tags to identify each type or field of information specified by the user, as well as separators between the different contacts 14-17 for which information is requested. An example is illustrated as follows:

"<matching>identical<first name>John<last name>Doe<company name>Acme/<matching>partial<city>Los Angeles<address>Main<last name>Anders*"

in which the tags for identifying each field are enclosed in angular brackets (< >) and a slash (/) is used to separate different requested contacts 14-17. Thus, in the specific example given above, the first tag indicates that the matching must identically match the following search criteria (i.e., button 255 has been clicked). In this regard, end user 21 is requesting contact information for a first contact 14 whose first name is "John", last name is "Doe" and company is "Acme" and for a second contact 15 whose city includes "Los Angeles", address includes "Main" and last name includes "Anders*n", where "*" is a wildcard character.

Also, where end user 21 is permitted to select from among multiple different query types, each corresponding to a different format, a code may be inserted into header information for the transmission indicating what the current format of the transmission is. Such header information may also include other preferences of end user 21, such as: the communication channel to be used for transmitting the desired contact information, the specific address on the communication channel to which the information is to be sent, the format in which such information is to be transmitted back to terminal 200, and/or any of the other settings that are described herein as being user-configurable.

In step 216, terminal 200 receives the contact information corresponding to the contact identifier(s) transmitted in step 214. As noted above, this might consist of a single contact record for a particular contact identifier (where the identifier uniquely identified contact 14) or multiple possible records (where the identifying information was non-unique) for the contact identifier. Preferably, the contact information is received over the same communications channels and/or networks used to transmit the identifying information. However, this is not necessary, and any other electronic or non-electronic delivery means may be used instead. As noted above, end user 21 may even specify an alternate communication channel for receipt of such contact information.

Thus, for example, even the device used to transmit the identifying information and the device used to receive the contact information might be different. For instance, end user 21 might input the contact identifying information into his or her wireless PDA (or telephone) and transmit such information from his PDA, but request that the contact information be sent to his home or work desktop computer, either instead of or in addition to his PDA. Such a configuration might be particularly advantageous where multiple employees are out in the field collecting contact information and a real-time central database of all collected contact information (i.e., at terminal 200) is desired.

In the preferred embodiment of the invention, the contact information includes multiple contact information fields for each contact record and is in a standard format so as to permit terminal 200 to unambiguously distinguish each of the contact information fields from each other by applying simple pre-specified mechanical rules, so that the information can be manipulated by computer-executable process steps. An embodiment to achieve this result is to use standard tags to identify the information in each field, in a similar manner to that described above for transmitting the contact identifiers. For example, the information following the tag <first name> would always be the first name of the contact, and the information following the tag <email1> would always be the primary email address for the contact. In this way, only the fields that actually contain content needed be transmitted to the end user 21, although some additional overhead is required to transmit the tags.

In an alternate embodiment all possible fields are transmitted to the end user 21 in a prescribed order and separated by standard delimiters. For example, if the standard order in which the fields are to appear is: first name; last name; telephone number; fax number; email address; . . . and a transmission consists of:

John; Doe; 555-123-4567;; abc@acme.com; . . .

then end user 21's terminal 200 would translate this as: first name is John, last name is Doe, telephone number is 555-123-4567, no fax number is provided, email address is abc@acme.com, . . . .

The actual format used may be standardized across all end users 21-25 or may be tailored to each individual end user 21. In this latter case, it is preferable to base the format upon the type of PIM 204 or 208 or the type of interface software 206 used by end user 21, as identified to hub 12 by end user 21 (e.g., during the end user registration process described above). More specifically, generally it will be preferable to match the format of the transmitted contact information to the format of the program used by terminal 200 to actually interpret such contact information. When only PIM 204 is used by terminal 200, such format generally will be the format understood by PIM 204. On the other hand, when the configuration shown in FIG. 7B is used, depending upon the specific embodiment and/or user settings, either interface program 206 or PIM 208 might be expected to interpret the received contact information, as described in more detail below.

In this regard, the present invention contemplates at least two distinct types of embodiments for receiving the contact information. The first involves direct communication between the central hub 12 and the terminal 200. In this type of embodiment, it is contemplated that the PIM 204 or the interface program 206 is already open and preferably had just been used to transmit the contact identifier(s) to hub 12. According to this embodiment, the PIM 204 or the interface program 206 receives the contact information from hub 12 and performs any processing for which it was previously configured, e.g., any desired combination of displaying and storing the information.

The other type of embodiment contemplated by the present invention uses less direct communication. This might include, for example, receiving an email from hub 12 that has an attached file with the contact information in a format that may at any time be opened by and/or saved to PIM 204 or 208.

Once the desired contact information has been received, any of a variety of different steps may be performed. Typically, such steps will depend upon the specific embodiment and the specific settings selected by end user 21 within that embodiment.

For example, in step 218 of FIG. 8 the contact information optionally is displayed. Preferably, an interface such as interface 280 (shown in FIG. 11) is used for displaying the contact information, regardless of whether the corresponding contact identifier originally was input: via interface 250, via interface 230, via any other interface, or in any other manner. In addition, if more than one matching record was returned for a given contact identifier, then this fact preferably also is indicated via interface 280, for example by displaying the message 282 "record m of M; contact identifier n of N", where m is the number of the current record for the $n^{th}$ contact identifier, M is the total number of matching records returned for the $n^{th}$ contact identifier, n is the number of the contact identifier presently under consideration, and N is the total number of contact identifiers submitted by end user 21. In this case, m can be varied from 1 to M by clicking on "next" button 285 or "previous" button 286.

When the desired contact information is found (i.e., the value of m corresponding to the desired contact 14), that information can be saved to end user 21's PIM 204 or 208 (described in more detail below in connection with step 220) by clicking on the "save" button 287. When this is done, depending upon, for example, a configuration setting in the PIM 204 or 208 or interface program 206, the remaining M−1 potentially matching contact information records can be either discarded or retained, for reviewing or saving at end user 21's discretion (e.g., depending upon previously configured user settings), and interface 280 preferably would then displayed the contact information for the next value of n.

Figure 11:
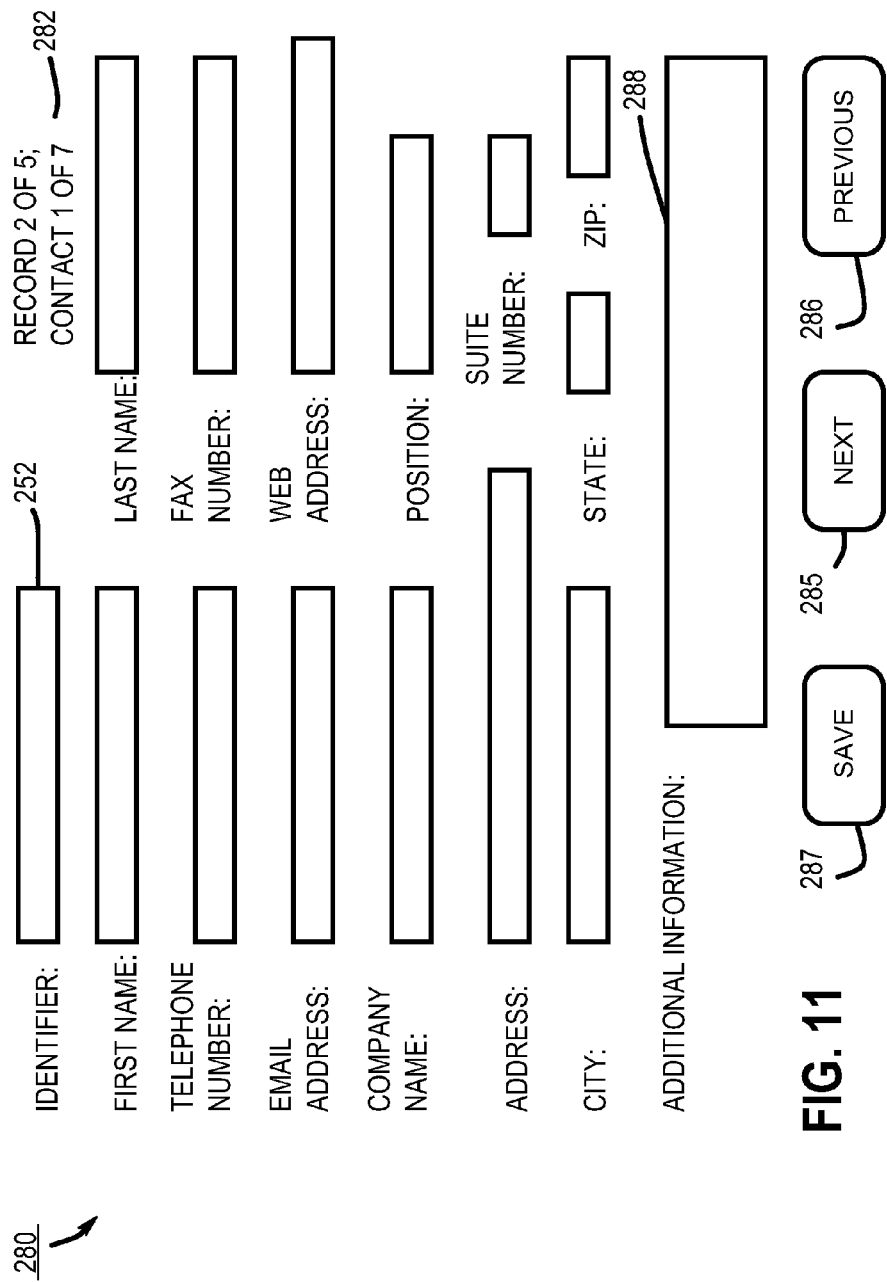
FIG. 11 illustrates a representative end-user interface for displaying received contact records in response to an end user request.

As shown in FIG. 11, interface 280 includes an "additional information" field 288. Such information might correspond to field 166 (shown in FIG. 5) and therefore might already include information provided by contact 14 which may then be supplemented by end user 21. Alternatively, in certain embodiments of the invention and depending upon the functionality and/or display capabilities of PIM 204 or interface program 206, field 288 might be provided as a separate field, in addition to a field (not shown) that displays the information input into field 166 by contact 14. In either event, requesting end user 21 preferably is permitted to enter information into a field 288, e.g., to record his or her own notes regarding contact 14 and/or to include links to other contact records in PIM 204 or PIM 208.

In addition to navigating among contact records corresponding to a single contact identifier, the "next" button 285 and "previous" button 286 preferably also can be used to navigate among contact records corresponding to different contact identifiers (i.e., the different values of n), where multiple such contact identifiers (i.e., a total of N) were submitted, e.g. using interface 230. Alternatively, different buttons may be provided on interface 280 for navigating through the different values of n than for navigating through the different values of m.

The foregoing display technique assumes direct communication between the hub 12 and the address book or interface program, and uses a special-purpose interface for displaying the received contact information. As noted above, that interface may be provided via a separate interface program 206 or may be embedded in PIM 204.

Alternatively, a less direct method of communication may instead be used. For instance, the contact information might be communicated as an attachment to an email, e.g., in the format that is native to end user 21's address book (in PIM 204 or PIM 208). More specifically, if end user 21 is using Microsoft Outlook™ then in this embodiment hub 21 sends an email to end user 21 with an Outlook vCard for each contact identifier specified by end user 21 (or multiple such vCards in the event that a single identifier resulted in multiple matches. Then, end user 21 generally will only need to double-click the attached file to display the contact information in the standard interface of end user 21's address book. Similar indirect communication techniques include downloading a contact record via an FTP file transfer.

Referring again to FIG. 8, in step 220 the received contact records optionally may be stored. Depending upon settings, each received contact record may be automatically stored in end user 21's address book upon receipt (irrespective of whether or not the record was displayed in step 218). Such automatic storage typically will only be available if direct communication between PIM 204 (or interface program 206) and hub 12 is accommodated. Alternatively, as noted above, a record might be stored only if end user 21 designates it for storage (e.g., after reviewing and approving the received contact information). Finally, it is possible to have embodiments in which the user is not given the option of storing the record at all, but instead is only permitted to view such information.

The specific storage process utilized preferably depends upon user settings, user configuration and the nature of the contact record information received by end user 21. Thus, for example, end user 21 might designate automatic storage in a situation where multiple contact identifiers are being submitted and it is anticipated that such multiple contact identifiers will uniquely identify the corresponding contacts 14-17. Such automatic storage might be implemented, for example, via PIM 204 or interface program 206 directly modifying end user 21's address book file, without any action on end user 21's part. It is noted that in such a case, where an interface program 206 is utilized, often it will not be necessary for interface program 206 to instantiate PIM 208. Preferably, PIM 204 or interface program 206 provides a message to end user 21 in the event that a submitted contact identifier did not match any record in hub 12's database 70.

On the other hand, if end user 21 anticipates that multiple contact records might be returned for a single contact identifier submitted, or if end user 21 is unsure of the accuracy of the contact records submitted, then end user 21 might wish to preview the returned contact records before designating whether or not to store such records. With regard to the indirect contact record communications techniques described above, storage typically will involve end user 21 dragging the received contact record file into the address book folder of end user 21's PIM 204 or 208, or some similar action by end user 21. Alternatively, end user 21 might first open the received file (e.g., by double-clicking it) and then save the information, if desired, by clicking the "save" button displayed by PIM 204 or PIM 208.

In certain embodiments of the invention, it is preferable to transmit a message back to hub 12 in this step 220 when terminal 200 stores a contact record that has been received from hub 12. By doing so, hub 12 is able to maintain records regarding the saved contact records for each of the end users 21-25. Alternatively, hub 12 might assume that each downloaded contact record is stored by the corresponding end user 21. However, such an assumption might not always hold true, particularly when multiple potential matching records are returned for a single requested contact identifier.

IV. Processing by the Hub

Figure 12:
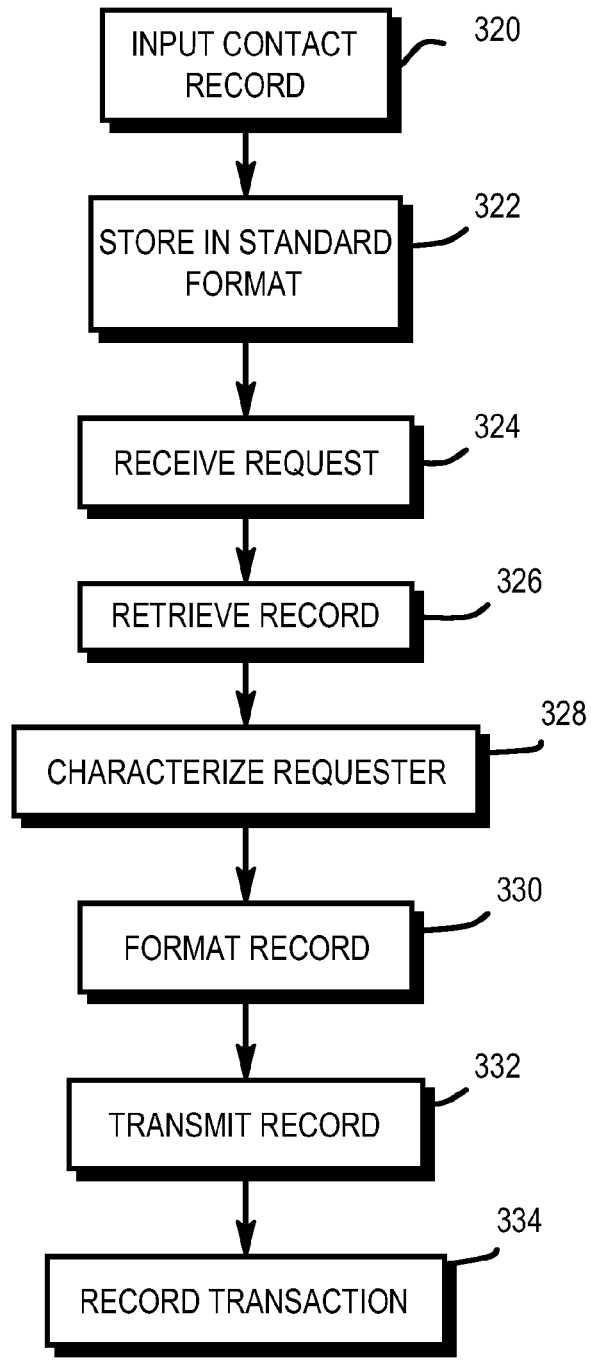
FIG. 12 illustrates a flow diagram for explaining certain central hub processing according to a representative embodiment of the present invention.

FIG. 12 illustrates a flow diagram for describing the processing performed by central hub 12 according to a representative embodiment of the invention. More specifically, FIG. 12 illustrates both the storing of contact records and the response by hub 12 to a request for a contact record from an end user 21.

Initially, in step 320 a contact record is input from a contact 14, e.g., during the initial registration by contact 14, or during a subsequent log-in session as described above in connection with FIG. 4. As noted above, in the preferred embodiment of the invention, the contact record is received as a TCP/IP message in response to the completion of a Web page template by a contact 14. Thus, the format in which the contact record is received from a contact 14 generally will be specified by hub 12.

In step 322, the record input in step 320 is stored in database 70 in a standard format. Preferably, this format will be the same for all contacts 14-17 using the system, but this is not necessary. In any event, the standard format preferably permits the contact information fields to be unambiguously distinguished from each other by applying simple pre-specified mechanical rules, so that the information can be interpreted, format-converted and/or otherwise manipulated by computer-executable process steps. Preferably, the format in which the contact records are stored by hub 12 is the same format in which such contact records are received from the various contacts 14-17. In addition, such format preferably is the same as, or substantially the same as, the format that is used by the interface program 206 or by the PIM 204 that is provided by, or endorsed by, hub 12. If the received format is not the same as the desired storage format, then any necessary conversion is performed prior to storage. Although not shown in FIG. 12, the contact record information may be modified by contact 14 during subsequent log-ins, as described above in connection with FIG. 4.

Upon storing each such contact record, hub 12 preferably indexes the contact record. Such indexing may be performed in accordance with any known indexing technique. The contact records may be singly indexed according to an (e.g., unique assigned) identifier, where each request includes the identifier for the desired contact. Alternatively, the records in database 70 may be multiply indexed (e.g., according to all available fields in the contact record), in which case end user 21 can have his or her choice as to which parameters are used as search terms.

In step 324, hub 12 receives a request for a contact record. Preferably, this request has been received via the Internet and or via a wireless (e.g., cellular-based) system, and includes the contact identifier transmitted by end user 21 in step 214.

In step 326, the contact record corresponding to the request received in step 324 is retrieved. In this regard, as noted above, the records in database 70 preferably have been indexed to facilitate searching. As further noted above, the request may include a unique identification code, in which case the matching record is retrieved based on that code. Alternatively, the request may include a search request, which in turn may include Boolean operators (e.g., AND, OR, XOR, NOT), wildcards (which replace one or more characters), truncation symbols (which represent any number of characters at the end of a word), multiple levels of parentheses, and any/or other known search mechanisms. Retrieval in this step 326 may be based on any known indexing system and may use any known search or retrieval techniques, including, for example, whole word searching, partial word searching, automatic searching for the plural form (if a singular form has been entered) or the singular form (if the plural form has been entered), checking for potentially misspelled equivalents, and/or phonetic matching.

As noted above, the received request also can include location information for terminal 200. Alternatively, hub 12 might seek to determine the geographic location of terminal 200, such as by retrieving a pre-stored location for end user 21 from its database 70, by using an Internet tracing technique, or by transmitting a message to the wireless carrier used by end user 21 requesting such information. In any event, such location information can be used by hub 12 to reduce the number of potentially matching records in database 70. For example, if the request only included the name of a chain store, the provided or obtained location information can be used to retrieve only the particular store that is closest to (or specified number of stores that are closest to, or the stores that are within a specified distance from) the location of end user 21.

In step 328, any necessary characteristics of the requesting end user 21 are identified. This preferably involves determining the type of PIM 204 or 208 and/or the type of interface program 206 that the requesting end user 21 has identified to hub 12 e.g., in the transmission of step 214 or during the end user registration process. In this latter case, the information preferably is retrieved from database 70 by indexing into database 70 based on the end user identification code transmitted in step 214.

Also in this step 328, any applicable preferences of end user 21 are identified. Such preferences may include, for example, where end user 21 would like the contact record information sent to, and/or the format in which to send such contact information each (e.g., as a direct communication or as an e-mail attachment). In the preferred embodiment of the invention, the default is to send the contact information to the sender's address that is identified in the message transmitted in step 214. In any event, such information preferably has been included in the message received in step 324 and/or is retrieved from database 70 based on the end user identification code.

In step 330, the retrieved record is formatted into the format appropriate for the requesting end user 21. In certain cases (such as where the PIM 204 or 208 used by end user 21 has been provided or endorsed by hub 12 and the contact records are stored in database 70 in that format), no reformatting will be required at all. In this regard, it is noted that it is preferable to store contact records in database 70 either in the format most widely used by end users 21-25 or in a standard format that is used in the PIM 204 provided (or endorsed) by hub 12 and/or in the interface program 206 provided by hub 12.

However, in many cases the standard format in which the contact records are stored in database 70 will be converted to the format used by the requesting end user 21. The conversion format preferably will be that used by the PIM 204 or 208 or by the interface program 206 that is used by end user 21, as designated by end user 21. In addition, the selected format may be based upon user preferences. For example, in the configuration shown in FIG. 7B, end user 21 might elect to have the contact information communicated directly to interface program 206. Alternatively, end user 21 might elect to have the contact information sent as an e-mail attachment that can be opened at any time by PIM 208.

In the preferred embodiment of the invention, this conversion is performed in a mechanical manner by executing computer-executable process steps which have been pre-written and are maintained by hub 12 (e.g., using conversion modules 81-85, as shown in FIG. 3B). Such pre-specified mechanical rules might entail, for example, any or all of: mapping the names of the field tags to different names; altering the order in which the different fields appear in the contact record; replacing delimiters between contact records and/or contact fields; and/or modifying or adding header information to the contact record.

The format conversion generally will be straightforward. However, in the event that certain fields are contained in the contact record stored in database 70 in that are not supported by PIM 204 or 208 or by interface program 206, as the case may be, such additional information may be simply omitted or may be inserted into a catchall field that is supported by such program, such as additional information field 288. The selection may be made, for example, independently by hub 12 or in accordance with settings selected by end user 21.

In step 332, the retrieved and reformatted (if necessary) record is transmitted to the requesting end user 21. The form of transmission preferably is dictated by the end user information obtained in step 328. For instance, if such information indicates that the PIM 204 or 208 or the interface program 206 used by requesting end user 21 includes functionality for direct communication (and end user 21 has indicated that such direct communication is desired), the retrieved record is directly transmitted to such program. Otherwise, the retrieved contact record is transmitted as an email attachment, downloaded using a file transfer protocol (FTP), or in any similar manner such that end user 21 may open the record using his or her PIM 204 or 208 at a later time. In either case, unless otherwise requested by the end user 21 (e.g., at the time of registration or in the request itself), the retrieved and reformatted (if necessary) contact record preferably is transmitted using the same communication channel through which the request was received (e.g., by transmitting it to the sender's address if the request came as an Internet protocol (IP) message over the Internet).

In step 334, the transaction is recorded so that the requesting end user 21 can be notified of any future updates to the contact record that has just been downloaded. Alternatively, hub 12 might wait until notification from end user 21 that a particular downloaded contact record has been stored before recording the transaction. Such updates and the process for notifying end users 21-25 are described in more detail below. In this regard, the transaction may be recorded in the database 70 entry for the contact 14 that corresponds to the downloaded contact record or may be recorded in the entry for the requesting end user 21. In either case, it is preferable to store in the transaction record the date and time of the transaction, as well as the identity of the requesting end user 21 and whether the downloaded contact records have been stored by end user 21 (unless storage is being assumed by hub 12).

It is noted that the foregoing steps may be rearranged and/or certain steps may be omitted, as will be apparent to those skilled in the art. For instance, in embodiments where only a single format is supported or where the format conversion occurs in interface 206 at the end user 21's terminal 200 (as described in more detail below), steps 328 and 330 above may be omitted entirely.

Figure 13:
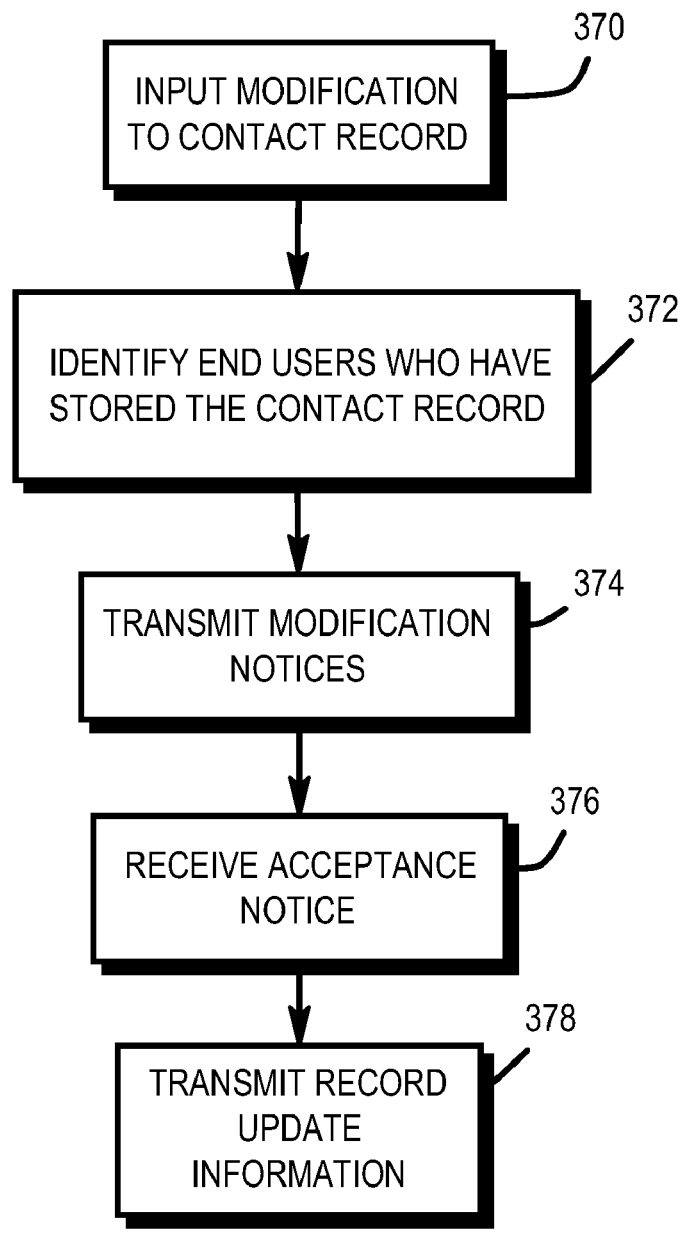
FIG. 13 illustrates a flow diagram for explaining end-user notification in the event of a contact record modification, according to a representative embodiment of the present invention.

FIG. 13 illustrates a flow diagram for explaining notification of end users 21-25 in the event of a modification to a stored contact record. Initially, in step 370 an end user 14 modifies its contact record (e.g., as described above in connection with FIG. 4).

In step 372, hub 12 identifies all end users 21-25 who have stored the contact record for contact 14. As noted above, in certain embodiments the terminal 200 will notify hub 12 of any contact records that have been stored, while in other embodiments storage of all downloaded contact records is assumed by hub 12. If the transaction records stored in step 334 above have been recorded in the database 70 entry for the contact 14, then this step 372 simply involves retrieving the stored identities of all such end users 21-25. On the other hand, if the transaction records stored in step 334 above have been recorded in the database 70 entry for the individual end users 21-25 that have requested and have stored the contact record for contact 14, then all end users 21-25 preferably are searched to determine whether they have stored the contact record for contact 14. It is noted that, rather than identifying all end users 21-25 that have stored the subject contact record in their local PIM 204 or 208, it is also possible (in a similar manner) to identify all end users 21-25 that have downloaded the contact record without regard to whether such contact record has been stored. Generally speaking, this is equivalent to assuming that all such end users 21-25 have stored the contact record.

In step 374, a notice is transmitted to each of the end users 21-25 identified in step 372, notifying such end users 21-25 that the contact record for contact 14 has been modified and inquiring as to whether each of such end users 21-25 wants to update their local PIM 204 or 208 with the new information. Preferably included in this inquiry is an automatic response button which can be simply clicked to transmit an affirmative answer. Generally speaking, in order to accommodate this functionality, the communications between hub 12 and each end user 21 will be in the form of direct communication to the end user 21's PIM 204 or 208. Alternatively, for example, hub 12 may be configured such that the notice is sent via an e-mail communication, and any reply to the e-mail communication is considered by hub 12 to be an affirmative response.

The foregoing notices may be transmitted by hub 12 when any contact record is modified or else hub 12 may wait and transmit such update notices periodically or after multiple contact records have been modified, so that each update notice at least has the possibility of including notices of multiple modified contact records, with separate response buttons for each. An advantage of this approach is that the end user 21 is not continually sent update notifications each time a contact record that it has stored is updated.

In step 376, hub 12 receives an acceptance message from at least one of the end users 21-25 to which the modification notice was transmitted in step 374. In response, the processing proceeds to step 378.

In step 378, the updated information is transmitted to the end user 21 who indicated that he or she wanted the update. As in step 332, the transmission in this step 378 may be accomplished in a variety of different ways, based upon end user 21's preferences and/or system settings. Thus, if end user 21 has a PIM 204 that permits direct communication or has an interface program 206, only the changed information may need to be transmitted. Upon receipt of such information, the applicable program running on terminal 200 preferably automatically incorporates such information into its stored contact record. However, such program made may instead display the changed information to end user 21 prior to incorporating it into its address book.

If the end user 21 does not support such direct communication, then an entire new record may need to be transmitted, e.g., via email or FTP. Upon receipt of such entire new contact record, end user 21 typically will store it into his or her address book folder, replacing the existing record in its entirety.

In alternate embodiments of the invention and/or where the indicated preferences of a particular end user 21 specify automatic updating, steps 374 and 376 may be omitted and the update performed automatically without the necessity of querying the end user 21. Typically, such alternate embodiments will require a PIM 204 or interface program 206 that includes appropriate functionality for direct communications with hub 12. Upon receipt of such updated information, PIM 204 or interface program 206 preferably will directly modify the address book file to incorporate such new information.

In either event, the end user 21 may specify that only certain fields are to be updated (as a default rule and/or for each specific update). One advantage of this feature is that if the end user 21 is using some of the fields in his or her contact records for personal annotations, the end user 21 can ensure that those annotations will not be overwritten.

Still further, the end user 21 may be provided with the ability at any time to request an update of his or her entire electronic address book, of only certain 30 contact records within his or her electronic address book (e.g., those designated by end user 21), or only those contact records that originally were obtained from hub 12. Depending upon which of the foregoing is being requested, the request message generated by terminal 200 might need to include certain contact information (e.g., in order to allow hub 12 to identify contact records to be updated that did not originate with hub 12, or simply to designate which contact records are to be updated).

V. Exemplary Embodiments

The description above sets forth the general concepts of the present invention. In this section, certain particular embodiments of the invention are discussed in more detail. These examples will serve to more clearly illustrate some of the techniques described above. In particular, the following examples will focus on the experience provided to the end users 21-25 according to representative embodiments of the present invention.

As is indicated above, the present invention generally contemplates that end user terminal 200 will have at least some interface functionality for communicating with hub 12. Such functionality may be provided in PIM 204, in stand-alone interface program 206 or in a combination of a stand-alone interface program 206 and PIM 208. However, no special functionality is required, and end user 21 might submit contact information requests via a Web page (i.e., using his or her Web browser), via an e-mail message, or via any other standard communication program. In any event, any such request preferably is structured so as to permit hub 12 to automatically interpret it without the necessity of human intervention.

First Embodiment

In the first embodiment described in this section, it is assumed that end user 21 is utilizing a conventional PIM 208 that has no special functionality for communicating with hub 208. Accordingly, all such functionality is provided in stand-alone interface program 206. Thus, in this embodiment interfaces 230 and/or 250 are provided by stand-alone interface program 206. As described above, such interfaces allow for wide flexibility in specifying contact identification information, including the specification of unique identification codes or arbitrary search parameters. In addition, program 206 may include functionality for downloading contact identifiers from a portable device 202 and/or functionality for accepting scanned-in contact identifiers.

After end user 21 inputs the contact identifier information into such interface and clicks the corresponding "submit" button 234 or 254, program 206 causes such information to be transmitted to hub 12. In addition, program 206 preferably transmits information regarding the preferences of end user 21 as to the manner in which end user 21 wishes to receive the requested contact record.

Various options exist in this regard. As noted above, the contact record may be transmitted directly to program 206. Alternatively, the contact record may be transmitted as an e-mail attachment or as a separate file via a FTP transfer. Similarly, different processing possibilities exist upon receipt of such information.

For instance, if the information is directly received by program 206, program 206 might instantiate PIM 208 and cause it to display the received contact record information. In this case, no further processing is required by program 206, and instead end user 21 can operate PIM 208 to save the contact record information if he or she so desires. Generally speaking, this option might be acceptable where only a single uniquely identified contact record has been requested. However, where multiple records are requested and/or where a contact 14 has been non-uniquely identified, generally it will be preferable to utilize special-purpose functionality for navigating through the returned contact records.

Thus, program 206 might itself display such information via its own user interface. Interface 280 might be provided by program 206 for this purpose. As seen in FIG. 11, interface 280 includes navigation buttons 285 and 286, as well as record and contact information 282. Once the "save" button 287 has been clicked, several options exist. For instance, program 206 might instantiate PIM 208 and cause PIM 208 to save the information currently displayed by program 206. Typically, in this embodiment program 206 would have some format conversion capability for converting contact information to a file format that can be used by PIM 208. Alternatively, when the "save" button 287 has been clicked program 206 might save such information by directly modifying the address book file used by PIM 208, without the necessity of instantiating PIM 208. In this embodiment, program 206 typically would be required to have knowledge of the format in which such address book file is maintained, and as well as of the location in which such address book file is stored.

If the requested contact record information is instead received as an e-mail attachment, generally it will be preferable for program 206 to perform no further processing. Instead, because the e-mail attachment(s) will be in a format that can be opened by PIM 208, PIM 208 can be used to view and/or save such information. However, in this case it is also possible to configure program 206 to continue monitoring for receipt of the e-mail message in response to its request, and upon receipt of such e-mail message, to cause PIM 208 to be instantiated and to open the contact record attachment (e.g., an Outlook™ vCard).

In the foregoing manner, an end user 21 might input a list of unique identification codes (e.g., via interface 230), click "submit" 234, and then automatically all of the corresponding contact records are stored into the PIM 208 for end user 21. Alternatively, end user 21 might enter a portion of the contact information for desired contact 14 into interface 250. Then, upon clicking on "submit" button 254 and receiving the response from hub 12, the remainder of the contact information automatically would be filled in (e.g., by displaying interface 280). As noted above, interface 280 preferably is substantially identical to interface 250. Accordingly, end user 21 would notice very little difference in his or her user interface. After reviewing the provided contact information, end user 21 might decide to save 287 such information or might determine that such information does not correspond to the desired contact 14 and, therefore, click "next" button 285 to view the next matching record.

Second Embodiment

In the second embodiment of the invention described in this section, all of the special-purpose functionality is included in PIM 204. Accordingly, no separate stand-alone program 206 is required. It is noted that PIM 204 might be provided by hub 12 or might be a conventional PIM that has been modified to include such functionality.

All of the functionality and processing options are the same in this embodiment of the invention as in the first embodiment described above. However, here, the user interface presented to end user 21 can be identical or nearly identical to the user interface that end user 21 is accustomed to seeing when working with his or her PIM 204. Of course, a separate stand-alone interface program 206 also might be constructed so as to provide such an interface that is identical or nearly identical to that provided by the PIM 208 with which it interfaces.

Third Embodiment

The above embodiments mostly contemplate user input of contact identifiers. In this embodiment of the invention, the end user 21 is provided with an electronic link to the contact identifier. For instance, contact 14 might include in an e-mail message to end user 21 a generic "link". Similarly, contact 14 might include a similar link in contact 14's Web page or other electronic document. Preferably, this "link" is in the form of a file that includes the (or a) unique assigned identification code for contact 14, that is in a format which is unique to hub 12 (referred to herein as file type .h12), and that has been provided to contact 14 by hub 12.

When the interface program used by end user 21 (e.g., PIM 204 or the stand-alone interface program 206) is installed in this embodiment of the invention, an association preferably is created such that file type .h12 is opened by such program. Thus, when end user 21 receives an e-mail message or views a Web page that includes such a file, merely double-clicking on such file opens it (e.g., with PIM 204 or the stand-alone interface program 206) and initiates the performance of the computer-executable process steps that cause the contact identifier embedded in the file to be transmitted to hub 12 (e.g., in step 214). In the preferred embodiment of the invention, such process steps preferably also insert the other types of information discussed above (e.g., end user identification code, address to which contact records are to be sent, the communication channel through which such records are to be sent, and/or any other preferences of end user 21) into such a message.

In the foregoing manner, a contact 14 can use its own .h12 file as a type of generic e-business-card, e-flyer or e-calling-card, as the case may be. Then, any end user 21 who clicks on such file can have the contact information for contact 14 downloaded to its terminal 200 in the format previously specified by end user 21.

Other techniques for achieving the same result also are possible. For example, rather than using PIM 204 or 208 or interface program 206 to open such a generic business card, the generic business card can be constructed as a Web page link. Preferably, included in such a link would be a unique identification code for contact 14. Thus, when end user 21 clicks on such a link a message would be sent to hub 12 which hub 12 would interpret as a request for the contact information record for contact 14. In response, hub 12 would obtain the formatting information for requesting end user 21, e.g., by retrieving such information from its database 70 (e.g., based on the IP address included in the request or by querying terminal 200, which latter technique generally would require PIM 204 or interface program 206 to be open) and then transmit the requested contact information in that format.

Figure 14:
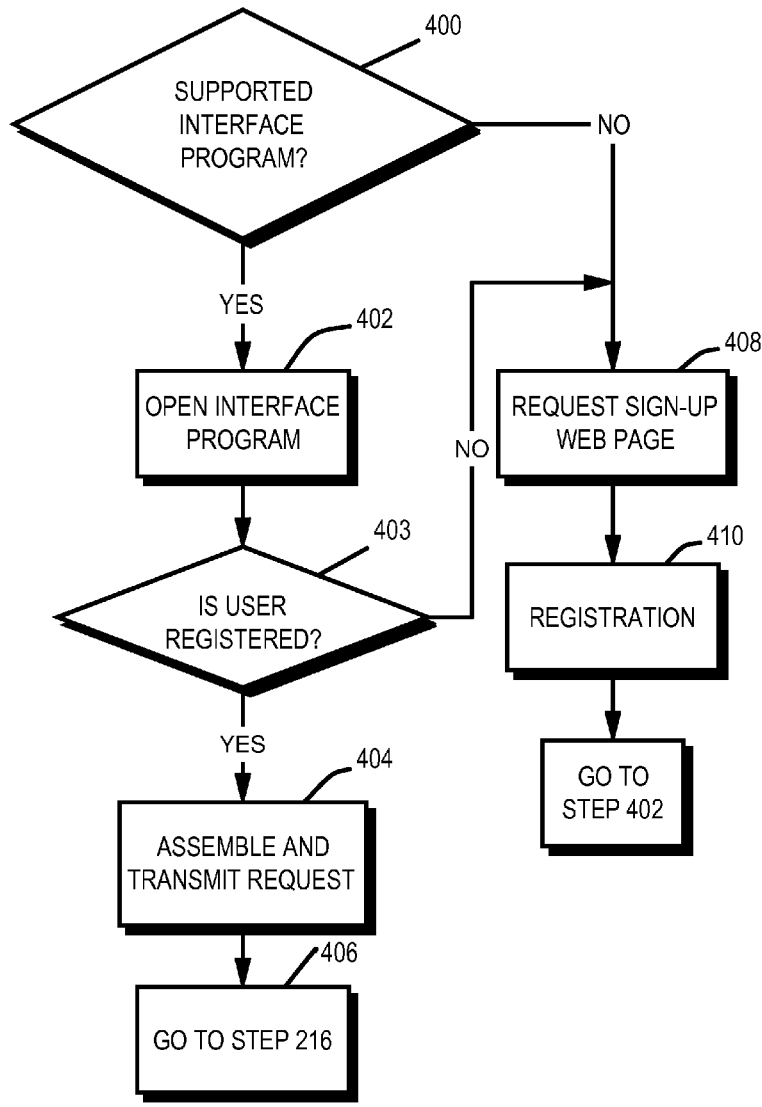
FIG. 14 is a flow diagram showing processing performed by an end user's terminal when processing a generic contact record "link" according to a representative embodiment of the present invention.

A similar alternative embodiment provides for executable process steps (e.g., JavaScript or a Java applet) that are either embedded in the electronic file provided by contact 14 or downloaded to terminal 200 in response to a link that is provided by contact 14. With regard to the latter of these two options, contact 14 preferably provides a Web page link as its "generic" link. Upon clicking on such link, a Web page is downloaded that includes JavaScript, a Java applet or similar executable code. In either event, the executed code preferably performs the following steps, which are shown in FIG. 14.

In step 400, the code determines whether terminal 200 has installed on it an interface program (e.g., PIM 204 or interface program 206) that is supported by hub 12. For example, a determination can be made whether certain known Windows™ registry values are present. Alternatively, such a determination can be made by determining whether a particular cookie exists (which cookie would only be present if a supported interface program had in fact been installed on terminal 200). If such a program is installed, then processing proceeds to step 402. Otherwise, processing proceeds to step 408.

In step 402, the interface program identified in step 400 is instantiated. Processing then proceeds to step 403.

In step 403, a determination is made as to whether end user 21 is registered as an end user with hub 12. Such a determination preferably is made by querying the interface program identified in step 400 for an end user identification code and then communicating with hub 12 to verify whether such identification code corresponds to a presently active account. If end user 21 is in fact registered with hub 12, then processing proceeds to step 404. Otherwise, processing proceeds to step 408.

In step 404, a request for a contact record is assembled and transmitted to hub 12. In the preferred embodiment of the invention, the code being executed has embedded within it the assigned unique identification code for contact 14. The executed code preferably also queries the interface program identified in step 400 for user preferences and any other information to be sent to hub 12. Other than the contact identifier (which preferably is embedded in the code being executed), the construction and transmission of the request is similar to step 214 described above.

Upon completion of this transmission, in step 406 processing proceeds to step 216 (shown in FIG. 8) in order to wait for the contact record to be downloaded. Thereafter, the remaining steps shown in FIG. 8 are performed in the manner described above.

If a supported interface program is not present on terminal 200, or if end user 21 is not registered with hub 12, then in step 408 the code the end user's Web browser and initiates a Web page request to hub 12 for hub 12 to download an end user registration (or sign-up) page.

Thereafter, in step 410 the Web browser operating on terminal 200 takes over and registration is performed over the Internet. Upon completion of the registration process, the executing code causes processing to proceed to step 402 to open the interface program (if not already opened) and then to assemble and transmit the contact record request corresponding to the generic link (i.e., in step 404).

For registered end users of hub 12, the foregoing technique permits automated downloading of contact information by inclusion of a generic "link" in an e-mail message, a Web page or any other document. On the surface, this is equivalent to the conventional technique of attaching a contact record (e.g., an Outlook™ vCard) to an email message, but without the corresponding compatibility problems. For non-registered end users, clicking on such a generic "link" will require such end users to register with hub 12 prior to downloading the desired contact record in the desired format, thereby increasing the number of end users 21-25 of hub 12.

Most implementations where such a generic link are used will involve the use of a small file that contains information for contacting hub 12 and for uniquely identifying contact 14 (which functions as the generic link itself). Then, the unique contact identification information is combined with information regarding end user 21 (e.g., identifying the format in which the contact record should be downloaded and the download "address") and the combined information is transmitted to hub 12. With this information, hub 12 can download the contact record as requested, all with minimal effort on the part of end user 21. Typically, this download will be the first time end user 21's terminal 200 receives the contact information for this particular contact 14, and therefore it will be newly added into end user 21's electronic address book.

While certain specific embodiments have been described above, various other techniques for initiating the transmission of a unique identification code to hub 12 based upon an end user 21 clicking on a generic "link" instead may be used, as will be apparent to those skilled in the art.

For purposes of the foregoing techniques, contact 14 may be provided with the ability to custom-designed various types of "contact links", each having a different combination of contact information fields. For example, contact 14 might design one generic link having his standard business contact information for sending to most of his clients and another having additional information (e.g., home telephone number, pager telephone number, mobile telephone number, etc.) for sending to his important clients. In the preferred embodiments of the invention, these various "contact links" may be pre-stored and then selected by contact 14 (e.g., from a drop-down menu) when contact 14 is creating an e-mail to sent out.

Fourth Embodiment

In the embodiments described above, the end user 21 has a local electronic address book on his or her terminal 200. In alternate embodiments, however, hub 12 stores the electronic address book for end user 21 and end user 21 only downloads contact records (or individual contact record fields) from hub 12 as needed. In this embodiment as well, each of the contacts 14-17 controls its own contact information, and that information is centrally maintained by hub 12 and preferably automatically updated in response to submissions from contact 14-17. However, in this embodiment it is not as important to have the contact information downloaded to requesting end user 21 in a standard format, as end user 21 will not need to store such information into his or her electronic address book and, generally, will not need to manipulate such data in any other way. Rather, in this embodiment end user 21 will be primarily interested in viewing the downloaded information. It is further noted that, in accordance with this embodiment of the invention, the end user 21 generally will only need a thin client running on his or her terminal 200.

Fifth Embodiment

Several special considerations apply where end user 21 is using a handheld wireless telephone or PDA (i.e., capable of fitting within the user's hand). Such considerations mainly result from the limited user interface (e.g., keyboard and display screen) provided by such small devices. With regard to wireless telephones in particular, it may be desirable to provide for a unique contact identifier for each contact 14 that is completely numeric. In addition, it may only be possible or desirable to store the name and one or two telephone numbers for each downloaded contact 14 into end user 21's wireless telephone. At the same time, end user 21 may wish to have the full contact record simultaneously downloaded to his or her personal computer.

Preferably, end user 21 is given a great deal of the flexibility in this regard during the initial registration process and may later change his or her preferences as his or her needs change over time. Thus, for example, an end user 21 might initially configure his or her profile such that multiple devices are to be accommodated, e.g., a personal computer and a wireless telephone (or a PDA or other handheld device). Such a profile might specify that end user 21's personal computer is to be provided with any or all of the functionality described above. At the same time, end user 21's wireless telephone may be configured to accept contact identification information in specific ways that are intended to limit the number of keystrokes that are required by end user 21. For example, a mode preferably is provided in which end user 21 merely is required to input a telephone number and click a "submit" button in order to retrieve and/or store the other contact information associated with the submitted telephone number, thereby avoiding the necessity of entering the contact's name, which often is a difficult task when only a numeric keypad is provided. If multiple matches result, or in certain embodiments even when only a single match is found, the wireless telephone preferably permits end user 21 to view the matches before deciding whether to store them (e.g., where multiple matches have been found, to store only the desired contact record in connection with the entered telephone number).

In a similar manner, a mode may be provided that allows such direct submission of a separate, unique wholly-numeric contact identifier. Where multiple modes are provided, end user 21 may select the desired mode, e.g., from a drop-down menu or by selecting a soft button that corresponds to the desired mode.

A system according to the present invention preferably allows the end user 21 to link his or her various devices in a wide variety of specified ways, during the registration process and/or in connection with each contact identifier submission. In the preferred embodiments, end user 21 may specify default settings during the initial registration process and then modify those default settings with each contact identifier submission. The following are representative settings that may be specified by end user 21.

When a contact identifier is submitted via end user 21's personal computer, corresponding contact records may be downloaded both to that personal computer and also to end user 21's wireless telephone (e.g., in different formats and possibly with different types of contact information, as appropriate to the specific devices). Alternatively, a corresponding contact record might only be downloaded to the wireless telephone after end user 21 has viewed multiple matching contact records that have been returned and selected the desired one. Still further, end user 21 might elect to have no corresponding contact records downloaded to his or her wireless telephone, e.g., in situations where separate synchronization is performed between the two devices.

Similar device linking may be specified in the reverse manner, with corresponding contact records originally requested via the wireless telephone being sent to end user 21's personal computer (e.g., either automatically or in response to a selection of a desired one of multiple matching records). Once again, the format and information types generally will be customized to the different devices.

As indicated above, in any embodiment that uses linking it is possible to download the requested contact information only to the linked device and not to the requesting device. For example, contact identifiers may be submitted or originally entered via a wireless telephone or PDA and then organized, stored, etc. only after end user 21 returns to his or her home computer. In one representative embodiment, the end user 21 enters one or more contact identifiers into his or her wireless telephone or PDA (which may have a wireless Internet connection or else simply be a standalone device), which contact identifiers are then merely stored in the portable device; only later, upon synchronizing the portable device to a desktop or laptop computer which is connected to central hub 12 (e.g., via the Internet), are the corresponding contact records requested (through the desktop or laptop computer) and stored into end user 21's wireless device and/or computer, e.g., depending upon the settings made by end user 21. Specifically, in such an embodiment, the synchronization software preferably would transfer the contact identifiers from the handheld device to the computer, cause the computer to request and retrieve the corresponding contact records, optionally display the received records, and then store any or all of such records (as designated by end user 21) into the electronic address book of the computer and/or the electronic address book of the handheld device (e.g., through the synchronization process).

Alternatively, as noted above, the contact records may be requested by end user 21's wireless device as soon as the corresponding contact identifiers have been entered into such wireless device; preferably at the option of end user 21, such records are downloaded to either or both of end user 21's wireless device or other connected computer.

In any of the embodiments of the present invention, hub 12 may be configured to accept an audio message submitted by end user 21 along with the contact identifier. Then, that audio message may be forwarded along with the downloaded contact information to the linked device, e.g., in order to remind the end user 21 (or advise another user of the linked device) of the relevance of the downloaded contact information. Alternatively, such an audio message may be stored locally on the requesting device and then saved together with the downloaded contact information for later reference. Such a stored audio message might, for example be used as a voice identification (e.g., the spoken name of contact 14) to be stored on terminal 200, along with the contact record. As a result, by incorporating even a relatively simple speech recognition program into terminal 200, end user 21 generally will be able to be provided with the ability to call up the contact record later by merely speaking the voice identification (i.e., the contact 14's name, in the present example). Such a feature is particularly desirable in connection with a wireless telephone or PDA, where hands-free use can be especially important.

Generally speaking, the downloaded contact information will be stored into the electronic address book in the device to which it is downloaded. However, it is also possible merely to view the downloaded contact information. Regardless of the embodiment, each downloaded contact record typically will include at least two, three, four or five different information fields, usually selected from the various contact records fields identified above.

Sixth Embodiment

The preceding embodiments generally assume a system that is widely open for members of the general public to register as end users 21-25 and as contacts 14-17. However, in certain embodiments a similar system may be largely restricted to end users 21-25 within an organization, or otherwise to only selected end users 21-25 who wish to share at least some of their contact records among other members of the group.

For example, within a company some of the employees may wish to make a portion of their address books available to other employees within the company. In such a case, an individual employee would upload to hub 12 all the contact records that he wishes to share and then would update them in the same manner that contacts 14-17 update their own contact information in the other embodiments described above. It is noted that in the present embodiment, each contact 14 generally will not be updating his or her own contact information, but instead one individual (who may not even be one of the contacts 14-17) would generally would be responsible for updating the contact information for multiple contacts 14-17.

Each of the other end users 21-25 would then have the ability to retrieve contact records for all contacts 14-17 maintained by hub 12, e.g., in the same manner described above for the other embodiments of the invention. Upon doing so, the automatic updating functionality described above in connection with FIG. 13 can be utilized to maintain current information across all employees (or members).

Such an intra-organization implementation may be implemented on a separate hub 12, or may be implemented as a separate virtual system on a hub 12 that implements other similar virtual intra-organization systems and/or one or more publicly accessible systems, with usernames and passwords to control access to the various systems.

In either case, when such a closed system is used contact records may still be shared with individuals outside of the organization, but such sharing generally will be on a more restricted basis than would be the case with a publicly accessible system. For instance, only certain designated individual(s) within the organization, who may be different depending upon who the contact is (e.g., in each case, the individual that is responsible for maintaining the contact information for a designated contact), may be provided with the ability to create generic e-business-cards for their corresponding contact(s) and/or the ability to specify lists of individuals outside the organization who would have the ability to respond to such generic e-business-cards.

Seventh Embodiment

Certain types of PIMs have more flexible configuration capabilities than those generally discussed above. Representative of these types of PIMs are the customer relationship management (CRM) software packages, such as GoldMine and Act!. Unlike simpler electronic address books and PIMs, these products typically allow the user to assign fields to be used. As a result, the same conversion routine typically cannot be utilized for different user implementations of the same electronic address book. Therefore, in addition to knowing which electronic address book the end user 21 is using, with certain types of products the format conversion routine also will need to know how the electronic address book has been configured by the end user 21. This information can be provided in a number of different ways.

The simplest way, assuming that the electronic address book has been designed or modified to interact with the system 10 according to the present invention (e.g., as discussed above in connection with FIG. 7A), is for the electronic address book itself to provide its configuration information. Such information preferably would be provided in the form of a mapping table, linking fields in the standard format to those created or selected by the end user 21.

Of course, if the conversion is to be performed by the electronic address book itself (e.g., in the configuration discussed above in connection with FIG. 7A), then there would be no need to provide such configuration information external to the electronic address book. In this case, the electronic address book could simply receive requested contact records in the standard format and then convert them internally.

Alternatively, the end user 21's terminal 200 could be provided with functionality for observing a mapping made by the end user 21 and then using the information from such observations for future format conversions. Such functionality may be provided within address book 204 (as discussed above in connection with FIG. 7A) or by interface 206 (as discussed above in connection with FIG. 7B). Essentially, the software in such an embodiment might provide a display of the information from a requested contact record using the standard (or other received) format. At the same time, the user 21 would have open his or her electronic address book, displaying a window for the creation of a new contact record. As user 21 drags and drops information from the display contact record in the standard format to the electronic address book new-contact window, the embedded software would generate a corresponding format conversion mapping table.

VI. Hardware Environment

As indicated above, many of the methods and techniques described herein can be practiced with a general-purpose computing device. Such a computer typically will include, for example, at least some of the following components: one or more central processing units (CPUs) or other processors, read-only memory (ROM), random access memory (RAM), input/output circuitry for interfacing with other devices and for connecting to one or more networks (which in turn may connect to the Internet or to any other networks), a display (such as a cathode ray tube, liquid crystal or touch-sensitive display), other output devices (such as a speaker, headphone or printer), one or more input devices (such as a mouse or other pointing device, keyboard, keypad, microphone or scanner), a mass storage unit (such as a hard disk drive), a real-time clock, a removable storage read/write device (such as for reading from and/or writing to a magnetic disk, a magnetic tape, an opto-magnetic disk, an optical disk, or the like), and a modem (which also may connect to the Internet or to any other computer network via a dial-up connection).

When the term "processor" is used herein, it should be understood that the term may refer to a single component that functions as a processor in a device or to the aggregate of multiple individual component processors within a device that can individually function as separate processors, but collectively perform the indicated function or functions. The term "network" or "communications network", as used herein, generally refers to any wired, wireless or combination system that permits individual nodes to communicate with each other.

In operation, the process steps to implement the above methods typically are initially stored in mass storage (e.g., the hard disk), are downloaded into RAM and then executed by the CPU out of RAM. However, in other embodiments, particularly where a mass storage device is omitted, such as in a PDA or wireless telephone, the process steps might initially be stored in RAM or ROM and executed directly out of such RAM or ROM.

Suitable computers for use in implementing the present invention may be obtained from various vendors. Various types of computers may be used, depending upon the size and complexity of the tasks, as well as the needs of the user. Suitable computers include mainframe computers, multiprocessor computers, commercially available Internet servers, workstations, personal computers, and smaller computers such as PDAs, wireless telephones or any other networked or non-networked appliance or device.

In addition to the components described above, wireless telephones, PDAs and other devices typically will be provided with an appropriate transceiver, many examples of which being known in the art.

Although a general-purpose computer system has been described above, a special-purpose computer may also be used. In particular, any of the functionality described above can be implemented in software, hardware, firmware or any combination of these, with the particular implementation being selected based on known engineering tradeoffs. In this regard, it is noted that the functionality described above primarily is implemented through fixed logical steps and therefore can be accomplished through programming (e.g., software or firmware), an appropriate arrangement of logic components (hardware) or any combination of the two, as is well-known in the art.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

VII. Additional Considerations

The present invention generally concerns systems, methods and techniques for originally storing contact information for new contacts 14-17 into an end user 21's electronic address book by creating a new contact record in such electronic address book. Thus, where contact records are discussed as being viewed and/or stored by terminal 200 above, this generally refers to information (i.e., contact records) for new contacts 14-17, unless otherwise clearly indicated to the contrary. Once a contact record has been stored, certain embodiments of the present invention also provide for the automatic updating of such contact records (e.g., as discussed in connection with FIG. 13).

Further variations on the embodiments described above also are possible. For example, in the embodiments described above, identification information and/or search criteria are transmitted by terminal 200 when a "submit" button is clicked. In an alternate embodiment, such information is transmitted as keystrokes are entered by end user 21 (e.g. every keystroke or every couple of keystrokes). In such embodiments, a matching contact record can be provided to end user 21 as soon as the entered keystrokes are sufficient to identify a contact.

In still further embodiments, the contact identification information and/or search criteria, rather than being transmitted immediately, are stored and later transmitted in a "batch" mode. Such a batch mode might be particularly advantageous where the availability or cost of bandwidth is different at different times.

In the embodiments described above, it is preferable that all user interfaces presented to end user 21 are as similar as possible to the user interface presented by end user 21's local PIM 204 or 208, or at least as similar as possible to each other. More specifically, in the preferred embodiments of the invention, only the navigation controls and certain informational fields will differ from one interface to another. However, the contact information fields and the arrangement thereof preferably are identical (or substantially identical) across all such user interfaces. As a result, the end user 21 is able to quickly identify the information fields that are of interest to him or her after her only a short period of time in using the system of the invention.

It is further noted that it is not always necessary to transfer an entire contact record to the requesting end user 21. Rather, only certain fields from a contact record may be transferred in certain cases. For example, the end user 21 might specifically designate which fields are to be downloaded to him or her. In addition, or instead, PIM 204 or 208 might restrict which fields are downloaded (e.g., to only those that it supports). As noted above, hub 12 might move information from one field in the stored contact record (e.g., a specific field) to another field in the contact record downloaded to end user 21 (e.g., a generic or "comments" field). Alternatively, PIM 204 or interface program 206 might include such functionality.

In the embodiments described above, typically hub 12 performs all format conversions in order to ensure that end user 21 receives the contact information in the correct format. However, it is also possible to perform such format conversions in end user 21's terminal 200 (e.g., by PIM 204 or by stand-alone interface program 206). In this case, all contact records can be transmitted to the various end-users 21-25 in the same standard format.

As a still further alternative, the format conversion may be performed by an intermediate system or entity. For example, the techniques of the present invention are particularly applicable to wireless telephones, PDAs and other devices. Typically, each such wireless device has an associated wireless service provider that supports the wireless device and, therefore, is quite familiar with its configuration. Accordingly, the requested contact record may initially be sent to the wireless service provider in the standard format and then the wireless service provider can perform the format conversion before forwarding the contact record to the requesting wireless terminal 200.

Where such a standard format is used for all communication of contact records, additional embodiments of the present invention are possible. For example, rather than using the hub-based system described above, peer-to-peer communications of such contact information become more feasible. However, such an implementation generally will require a full set of format conversion modules (e.g., 81-85) to be provided on each end user terminal 200.

As noted above, a single individual might have different capacities as different contacts 14-17. In certain preferred embodiments of the invention, hub 12 provides reports to each contact 14-17 regarding the identities of the end-users 21-25 that have downloaded and/or stored its contact information. Such reporting information can be very useful to a contact 14 in terms of assisting him or her to focus his or her marketing efforts.

In addition, in more particular embodiments of the invention, such reporting information is combined with functionality for managing all the end-users 21-25 who have stored contact 14's contact record, across all of contact 14's various capacities. This arrangement often can help a contact 14 to manage the contact information that is provided to each of various end users 21-25. For example, a single individual with multiple contact capacities might initially have provided contact information to a particular end user 21 in one of contact 14's capacities (e.g. its business capacity), but then later decide to make available to such end user 21 its contact information in one of its other capacities (e.g., its personal capacity). In preferred embodiments of the invention, this process is fully automated so that merely clicking on an end user 21 in the consolidated report provided by hub 12 to contact 14 and then designating the additional capacity causes a message to be sent to hub 12 instructing hub 12 to transmit such information (or at least a notice that such information is available) to end user 21. Similarly, in such embodiments, contact 14 may designate certain specific items of information, rather than an entire contact record, to be transmitted to any of the designated end users 21-25.

In related embodiments of the invention, the end users 21-25 are provided with the ability to object to making their personal information available to contacts 14-17. In these embodiments, contacts 14-17 preferably are provided at least with demographic and/or generic or non-personally identifying information regarding the end users 21-25 that have downloaded and/or stored their contact information.

At the very least, it is preferable to provide each contact 14 with reports on aggregate statistics regarding the number of downloads of such contact 14's contact record. More preferably, such reports break the statistics down by end-user categories (e.g., salespersons, lawyers, accountants, etc.), by geographic location of the downloaded and users, and/or by other criteria of interest. Such information can then form the basis for determining the amount of fees to be paid by each contact 14 for his or her subscription to the service provided by central hub 12.

As noted above, the present invention contemplates different categories of contacts 14-17. Preferably, end users 21-25 also are given the option of searching within a single category, as well as searching across all possible categories. Thus, for example, an end user 21 who wants information regarding a particular fast-food restaurant need only search the e-flyer category and thereby can avoid retrieving e-business cards, e.g., for executives of the fast-food corporation. For these purposes, an additional field (or check boxes or other selection mechanism) that allows a selection among different categories may be added to display interface 250.

Such an embodiment contemplates that the different categories of contact information will be processed by a single system, with distinctions made by the various end users 21-25. However, it should be noted that it is also possible to provide different systems for the different categories of contact records. This may be particularly preferable where the end users 21-25 are accustomed to considering the different categories in significantly different manners. Thus, for example, a system may be provided for processing e-flyer contact records, which end users 21-25 associate with a sort of electronic Yellow Pages. At the same time, a separate system may be provided for processing e-business-cards and e-calling-cards, which end users 21-25 associate with the entirely different process of exchanging printed business cards.

In either event, contacts 14-17 preferably are required to register for each different contact capacity with hub 12. In the business model associated with this system, the pricing for each different category of contact record preferably is structured differently based on the value to contact 14 of having a contact record maintained by hub 12 in that specific category.

One aspect of the present invention, in certain of the embodiments described above, is the provision of a central hub 12 that provides contact record format conversions. This functionality also can be used advantageously in other situations. For example, as noted above, hub 12 preferably maintains records of which contact records are downloaded (or stored) by each of the end users 21-25. Using this information, the entire address book for a particular end user 21 can be downloaded in any desired format that it is supported by hub 12. Such a feature can be particularly advantageous where end user 21 is migrating from one PIM to another PIM and wishes to transfer his prior address book over to his or her new PIM, where the end user 21 wants a backup copy of his or her electronic address book (for later restoring the event that the electronic address book becomes damaged or corrupted), or where end user 21 wishes to share his or her entire address book or a portion thereof with another end user 22. In this case, conversion modules 81-85 convert all (or a portion, as the case may be) of the contact records associated in database 70 with a particular end user 21 from the standard format to the particular format used by the new PIM or by the other end user 22. Still further to this point, central hub 12 might provided end user 21 with an optional service whereby a copy of the archived record is maintained for each contact record downloaded to end user 21, giving end user 21 the ability to later restore (or transfer) either the archived contact record or the most recent update thereof.

Moreover, by providing hub 12 with reverse conversion modules, each converting from a particular (e.g., PIM) format to the standard storage format used in database 70, the end user 21 can be provided with the ability to upload to hub 12 any of its contact records that were not originally obtained by end user 21 from hub 12 (or simply his or her entire electronic address book contents). Accordingly, end user 21's entire address book can be replicated at hub 12, irrespective of which contact records originated with hub 12. This entire address book can then be migrated to a different PIM or shared with a different end user 22 (either in the form uploaded or with automatic updates to the contact records therein).

As noted above, in certain embodiments of the invention an end user 21 has the ability to search for contacts 14 by submitting non-uniquely identifying search criteria. In those embodiments, there is a possibility that undesired end users 21-25 may be able to access and store the contact information for contacts 14-17 too easily. Therefore, it may be preferable to permit the individual contacts 14-17 to limit the fields in their corresponding contact records which may be searched. In addition, or instead, hub 12 may take steps to preclude mass downloading of contact information, such as by: limiting the number of contact records that may be downloaded by each end user 21, locking out an end user 21 if the end user 21 requested too many non-existent records, preventing direct sharing of contact information among end users 21-25, limiting the number of matching contact records provided to each requesting end user 21, monitoring and restricting repeated broad searches conducted by the same end user 21 (e.g., to identify and stop end users 21-25 who appear to be attempting to build a customer database) and/or repeated similar broad searches conducted across multiple end users 21-25 (e.g., to prevent circumvention by registering and using multiple end user accounts), and/or correlating reports of junk email from registered contacts 14-17 with broad searches conducted by registered end users 21-25.

Another technique for limiting abuse of the system is to require identify-confirming information, in addition to a unique identification code for each requested contact record. For example, in order to retrieve a contact record, the request might be required to include both a unique identifier (e.g., a telephone number or e-mail address) and some other information that typically would be included on the desired contact 14's business card (e.g., the first 2-3 letters of the contact 14's last name). This typically would ensure that the requesting end user 21 actually saw a printed business card for contact 14 or had other knowledge of his or her contact information. Then, system 10 could cut off any end user 21 that had too many invalid contact record requests. Of course, such a prevention technique generally would only be successful if the information for contact 14 is only available through a unique-identification request, as opposed to in response to a general search query. In the preferred embodiments of the invention, each contact 14 has the ability to choose whether or not to make his or her contact information available through general search queries.

It is presently contemplated that system 10 will be set up as a fee-based system. In the preferred embodiments, the contacts 14-17 are charged a flat monthly or yearly fee for making their contact information available through system 10. This fee may be different, depending upon whether a given contact 14 is registering an e-flyer, an e-business-card or an e-calling-card.

Alternatively, the contacts 14-17 may be charged based upon the number of downloads of their contact information and/or based upon who is downloading such contact information (e.g., with "quality" end user 21 downloads requiring higher fees). In either the event, the fees preferably are charged as an add-on to another subscription-based service (e.g., a telephone bill). In certain cases, it may be preferable to eliminate the fee for certain categories of contacts 14-17 (e.g., e-calling-card subscribers).

In addition, or instead, it is possible to charge fees to the end users 21-25 for each contact record downloaded (or at least for certain categories of contact records downloaded). For example, an end user 21 might be charged for downloading an e-calling-card record for which no fee has been paid by the corresponding contact 14, but not be charged for downloading an e-flyer or an e-business-card for which a fee has been paid by the corresponding contact 14. Once again, it is preferable to include such fees in the bills for another subscription-based service to which the end user 21 subscribes (e.g., a wireless telephone bill).

In certain cases, the above description refers to a wireless device. Such a device might be a cellular-based communication device, e.g., using code division multiple access (CDMA), time division multiple access (TDMA), global system for mobile communications (GSM) or any other standard. Alternatively, a wireless device according to the present invention may be of shorter range, such as a portable telephone, a Bluetooth device or a device communicating according to one of the 802.11xx protocols.

Several different embodiments of the present invention are described above, with each such embodiment described as including certain features. However, it is intended that the features described in connection with the discussion of any single embodiment are not limited to that embodiment, but may be included and/or arranged in various combinations in any of the other embodiments as well, as will be understood by those skilled in the art.

Also, in the discussion above, certain functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above.

Rather, it is intended that all such variations not departing from the spirit of the invention be considered as within the scope thereof as limited solely by the claims appended hereto.

What is claimed is:

1. A computer-readable medium storing computer-executable process steps for supplementing the contents of an electronic address book, said process steps comprising steps of:
   inputting a designation of a contact record within an electronic address book;
   based on said designation, creating a request message that includes at least one of: (i) contact information from said contact record or (ii) information identifying said contact record;
   transmitting the request message to a central hub that maintains and distributes contact information;
   receiving updated contact information from the central hub in response to the transmitted request message; and
   incorporating the received updated contact information into the contact record.

2. A computer-readable medium according to claim 1, wherein the request message includes contact information from said contact record, and wherein the contact record was not originally obtained by the electronic address book from the central hub.

3. A computer-readable medium according to claim 1, wherein said process steps further comprise steps of inputting and following user-specified instructions indicating that only certain fields are to be updated.

4. A computer-readable medium according to claim 1, wherein said designation includes only certain specified contact records within the electronic address book.

5. A computer-readable medium according to claim 1, wherein said designation includes only those contact records that originally were obtained from the central hub.

6. A computer-readable medium according to claim 1, wherein said process steps further comprise a step of displaying the updated information prior to incorporating it into the contact record.

7. A computer-readable medium according to claim 1, wherein the received updated contact information automatically is incorporated into the contact record.

8. A computer-readable medium according to claim 1, wherein the designated contact record includes plural different contact information fields.

9. An apparatus for implementing and supplementing the contents of an electronic address book, comprising:
   an electronic address book that stores contact information records;
   means for inputting a designation of a contact record within said electronic address book;
   means for creating a request message, based on said designation, that includes at least one of: (i) contact information from said contact record or (ii) information identifying said contact record;
   means for transmitting the request message to a central hub that maintains and distributes contact information;
   means for receiving updated contact information from the central hub in response to the transmitted request message; and
   means for incorporating the received updated contact information into the contact record.

10. An apparatus according to claim 9, wherein the request message includes contact information from said contact record, and wherein the contact record did not originate from the central hub.

11. An apparatus according to claim 9, further comprising means for inputting and following user-specified instructions indicating that only certain fields are to be updated.

12. An apparatus according to claim 9, wherein said designation includes only certain specified contact records within the electronic address book.

13. An apparatus according to claim 9, wherein said designation includes only those contact records that originally were obtained from the central hub.

14. An apparatus according to claim 9, further comprising means for displaying the updated information prior to incorporating it into the contact record.

15. An apparatus according to claim 9, wherein the received updated contact information automatically is incorporated into the contact record.

16. An apparatus according to claim 9, wherein the designated contact record includes plural different contact information fields.

17. A computer-readable medium according to claim 1, wherein the updated contact information is retrieved from the contact information that is maintained and distributed by the central hub, wherein all of said contact information maintained and distributed by the central hub is accessible by each of a plurality of different end users, and wherein said different end users include at least one of the general public or all registered users.

18. A computer-readable medium according to claim 1, wherein said designation of the contact record has been made by an end user.

19. An apparatus according to claim 9, wherein the updated contact information is retrieved from the contact information that is maintained and distributed by the central hub, wherein all of said contact information maintained and distributed by the central hub is accessible by each of a plurality of different end users, and wherein said different end users include at least one of the general public or all registered users.

20. An apparatus according to claim 9, wherein said designation of the contact record has been made by an end user of said apparatus.

* * * * *